United States Patent [19]
Robotham et al.

[11] Patent Number: 6,084,590
[45] Date of Patent: Jul. 4, 2000

[54] MEDIA PRODUCTION WITH CORRELATION OF IMAGE STREAM AND ABSTRACT OBJECTS IN A THREE-DIMENSIONAL VIRTUAL STAGE

[75] Inventors: John S. Robotham, Belmont, Mass.; Curt A. Rawley, Windham, N.H.

[73] Assignee: SynaPix, Inc., Lowell, Mass.

[21] Appl. No.: 08/949,166

[22] Filed: Oct. 10, 1997

Related U.S. Application Data

[60] Provisional application No. 60/043,075, Apr. 7, 1997.

[51] Int. Cl.[7] .................................................. G06T 15/00
[52] U.S. Cl. ........................................ 345/419; 345/473
[58] Field of Search ..................... 345/473, 419

[56] References Cited

U.S. PATENT DOCUMENTS

| | | | |
|---|---|---|---|
| 3,947,833 | 3/1976 | Eckstein, Jr. ........................ | 340/258 R |
| 3,970,841 | 7/1976 | Green ................................. | 250/201 |
| 4,175,860 | 11/1979 | Bacus ................................. | 356/39 |
| 4,385,322 | 5/1983 | Hubach et al. ..................... | 358/221 |
| 4,620,318 | 10/1986 | Hill .................................... | 382/2 |
| 4,639,768 | 1/1987 | Ueno et al. ........................ | 358/22 |
| 4,646,229 | 2/1987 | Boyle ................................. | 364/200 |
| 4,661,986 | 4/1987 | Adelson ............................. | 382/41 |
| 4,667,221 | 5/1987 | Cawley et al. ..................... | 358/22 |
| 4,682,300 | 7/1987 | Seto et al. ......................... | 364/571 |
| 4,685,146 | 8/1987 | Fenster et al. .................... | 382/54 |
| 4,692,806 | 9/1987 | Anderson et al. ................. | 358/209 |
| 4,703,514 | 10/1987 | van der Wal ...................... | 382/41 |
| 4,706,296 | 11/1987 | Pedotti et al. ..................... | 382/42 |
| 4,835,532 | 5/1989 | Fant .................................... | 340/728 |
| 4,847,688 | 7/1989 | Nishimura et al. ................ | 358/125 |
| 4,849,746 | 7/1989 | Dubner ............................... | 340/728 |
| 4,858,000 | 8/1989 | Lu ....................................... | 358/84 |
| 4,864,394 | 9/1989 | Gillard ................................ | 358/105 |
| 4,870,692 | 9/1989 | Zuiderveld et al. ................ | 382/6 |
| 5,058,042 | 10/1991 | Hanna et al. ....................... | 364/522 |
| 5,063,603 | 11/1991 | Burt .................................... | 382/37 |

(List continued on next page.)

FOREIGN PATENT DOCUMENTS

| | | |
|---|---|---|
| 93/07554 | 4/1993 | WIPO . |
| 93/21636 | 10/1993 | WIPO . |
| 96/31047 | 10/1996 | WIPO . |
| 96/31979 | 10/1996 | WIPO . |
| 97/03416 | 1/1997 | WIPO . |

OTHER PUBLICATIONS

Poelman, C.J., "The Paraperspective and Projective Factorization Methods for Recovering Shape and Motion", *Carnegie Mellon School of Computer Science*, (Jul. 1995).

Becker, S., et al., "Semiautomatic 3–D Model Extraction From Uncalibrated 2–D Camera Views," *MIT Media Laboratory*.

(List continued on next page.)

*Primary Examiner*—Mark R. Powell
*Assistant Examiner*—Motilewa Good-Johnson
*Attorney, Agent, or Firm*—Hamilton, Brook, Smith & Reynolds, P.C.

[57] ABSTRACT

In a media production system, two-dimensional images captured from physical objects are analyzed to create three-dimensional representations of the physical objects within a virtual stage. Representations of physical and synthetic objects are manipulated and choreographed in the virtual stage within an integrated system which also generates a media product in the form of a two-dimensional image stream of the physical and synthetic objects with optional synchronized audio tracks. A correlation is maintained between object models in the virtual stage and the original two-dimensional images so that information from those images can be included in the final product. To facilitate direction of combined media products, a composite display of the three-dimensional virtual stage and a two-dimensional preview are provided. Also provided are a score display providing temporal representations of elements within the scene and an object catalog of object oriented representations of elements within the scene.

47 Claims, 7 Drawing Sheets

U.S. PATENT DOCUMENTS

| | | | |
|---|---|---|---|
| 5,067,014 | 11/1991 | Bergen et al. | 358/105 |
| 5,133,070 | 7/1992 | Barker et al. | 395/650 |
| 5,134,473 | 7/1992 | Nagura | 358/109 |
| 5,140,416 | 8/1992 | Tinkler | 358/88 |
| 5,210,799 | 5/1993 | Rao | 382/22 |
| 5,212,544 | 5/1993 | Kellar et al. | 358/22 |
| 5,259,040 | 11/1993 | Hanna | 382/41 |
| 5,260,791 | 11/1993 | Lubin | 358/160 |
| 5,261,041 | 11/1993 | Sueman | 345/452 |
| 5,270,756 | 12/1993 | Busenburg | 358/109 |
| 5,296,926 | 3/1994 | Nagura | 348/144 |
| 5,307,456 | 4/1994 | MacKay | 395/154 |
| 5,325,449 | 6/1994 | Burt et al. | 382/56 |
| 5,355,450 | 10/1994 | Garmon et al. | 395/162 |
| 5,414,806 | 5/1995 | Richards | 395/135 |
| 5,455,775 | 10/1995 | Huber et al. | 364/488 |
| 5,473,364 | 12/1995 | Burt | 348/47 |
| 5,479,597 | 12/1995 | Fellous | 395/154 |
| 5,488,674 | 1/1996 | Burt et al. | 382/284 |
| 5,511,153 | 4/1996 | Azarbayejani et al. | 395/119 |
| 5,577,190 | 11/1996 | Peters | 395/501 |
| 5,588,104 | 12/1996 | Lanier et al. | 395/326 |
| 5,588,139 | 12/1996 | Lanier et al. | 395/500 |
| 5,596,687 | 1/1997 | Peters, Jr. | 395/130 |
| 5,596,696 | 1/1997 | Tindell et al. | 395/806 |
| 5,619,628 | 4/1997 | Fujita et al. | 395/127 |
| 5,696,892 | 12/1997 | Redmann et al. | 395/125 |
| 5,751,289 | 5/1998 | Myers | 345/419 |
| 5,850,352 | 12/1998 | Moezzi et al. | 364/514 |
| 5,903,271 | 5/1999 | Bardon et al. | 345/419 |
| 5,917,494 | 6/1999 | Arai et al. | 345/419 |
| 5,917,495 | 6/1999 | Doi et al. | 345/419 |

OTHER PUBLICATIONS

Sawhney, H.S., "3D Geometry From Planar Parallax," *Machine Vision Group—IBM Almaden Research Center*, (1994).

Gagalowicz, A., "Collaboration Between Computer Graphics and Computer Vision," *Proceedings of the Third International Conference on Computer Vision*, Osaka, Japan, pp. 733–737 (Dec. 4–7, 1990).

Menon, J., "Collaborative Visualization and Modeling," *Proceedings of the 1997 International Conference on Shape Modeling and Applications*, Aizu–Wakamatsu, Japan, pp. 178–187 (Mar. 3–6, 1997).

Thalmann, N.M., and Thalmann, D., "Virtual Actors Living in a Real World," *IEEE*, pp. 19–29, (1995).

Blondé, L., et al., "A Virtual Studio for Live Broadcasting: The Mona Lisa Project," *IEEE MultiMedia*, pp. 18–28, (Summer 1996).

Hayashi, M., "Image Compositing Based on Virtual Cameras," *IEEE MultiMedia*, pp. 36–48, (Jan.–Mar. 1998).

Ballard, D.H., et al., "An Approach to Knowledge–Directed Image Analysis," *Computer Vision Systems*, (1978).

Burt, P.J. et al., "The Laplacian Pyramid as a Compact Image Code," *IEEE Transactions on Communications, COM–31*(4):532–540, (Apr. 1983).

Williams, T.W. et al., "Model–Building in The Visions System," *Massachusetts Institute of Technology 5th International Joint Conference on Artificial Intelligence*, 2:644–645, (Aug. 1977).

Jancene, P. et al., "RES: Computing the Interactions Between Real and Virtual Objects in Video Sequences."

Rohrer, R., "Automated Construction of Virtual Worlds Using Modeling Constraints," *The George Washington University—Progress Report*, (Jan. 1994).

Debevec, P.E., et al. "Modeling and Rendering Architecture from Photographs: A Hybrid Geometry–and Image–Based Approach," *Computer Graphics Proceedings, Annual Conference Series*, 11–20, (1996).

Debevec, P.E., et al. "Recovering High Dynamic Range Radiance Maps from Photographs," *Computer Graphics Proceedings, Annual Conference Series*, 369–378, (1997).

Alzarbayejani, A., et al. "Recursive Estimation of Motion, Structure, and Focal Length," *IEEE Transactions on Pattern Analysis and Machine Intelligence*, 17(6):562–575, (Jun. 1995).

Berthold, K.P.H., et al. "Determining Optical Flow," *Artificial Intelligence*, 17:185–203, (1981).

Brooks, R.A., et al. "Geometric Modeling in Vision for Manufacturing," *SPIE*, 281:141–159, (1981).

Fua, P., "Model–Based Optimization: An Approach to Fast, Accurate, and Consistent Site Modeling from Imagery," *Artificial Intelligence Center—SRI International*.

Fua, P., et al. "Using 3–Dimensional Meshes to Combine Image–Based and Geometry–Based Constraints," *SRI International*.

Tomasi, C., et al., "Shape and Motion from Image Streams: a Factorization Method—Planar Motion," *Carnegie Mellon School of Computer Science*, (Sep. 1990).

Tomasi, C., et al., "Shape and Motion from Image Streams: a Factoriation Method—Point Features in 3D Motion," *Carnegie Mellon School of Computer Science*, (Jan. 1991).

Tomasi, C., et al., "Shape and Motion from Image Streams: a Factorization Method," *Carnegie Mellon School of Computer Science*, (Sep. 1991).

Little, T.D.C., et al., "Interval–Based Conceptual Models for Time–Dependent Multimedia Data," *Boston University Multimedia Communications Laboratory and Purdue University Shcool of Electrical Engineering Multimedia Communications Lab*, (May 1993).

Schechter, G., et al., "Functional 3D Graphics in C++—with an Object–Oriented, Multiple Dispatching Implementation," *Eurographics Object–Oriented Graphics Workshop*, (1994).

Elliott, C., "The Essence of ActiveX Animation," *Microsoft Research*, (Feb. 1997).

Elliott, C., "A Brief Introduction to Active VRML," *Microsoft Research Technical Report*, (Feb. 1996).

Maestri, G., "Parametric, Object–Oriented Modeling and Animation with Houdini," pp. 48–50, *Digital Magic*, (Aug. 1997).

Drazovich, R.J., et al., "Radar Target Classification," pp. 496–501, *IEEE*, (Aug. 1981).

Levine, M.D. et al., "A Knowledge–Based Computer Vision System," pp. 335–352, *Computer Vision Systems*, (1978).

State, A. et al., "Superior Augmented Reality Registration by Integrating Landmark and Magnetic Tracking," pp. 429–438, *Computer Graphics Proceedings, Annual Conference Series*, (1996).

"Middlesex Virtual Set System," *Product Brochure*, (1997).

"Cyberset O Highland Virtual Set," *Product Orad High–Tec Systems*, (1997).

"Virtual Replay Sports Analysis Tool," *Product Brochure*, (1997).

"Jaleo Digital Post Production System," *Product Brochure*, (1997).

"Flint and Flint RT," *Product Brochure*, (Mar. 1997).

"Warner Digital Creates Glacial Gales," *American Cinamatographer*, pp. 38–39, (Jul. 1997).

"Digiscore Saves the Day," *Product Flyer*, (1996).

"Inferno," http://www.discreet.com, (1991).

"Flame," *Product Description*, http://www.discreet.com, (1997).

"Composer V4,", *Alias Wave Front Product Description*, (1995).

"Power Animator," *Alias/Wavefront Product Brochure*, (1996).

"SoftImage 3D 3.51 for Windows," *Product Review*, (1995).

"3D Studio Max," *Product Review*, (1997).

"Animation Master," *Product Demonstration*, (1997).

Clarkson, M.,"3D Animation Tools for Less Than $41,500," *PC Graphics and Video*, pp. 52–56, (Aug. 1996).

Hamlin, J.S., "Autodessys' 3D Modeler FormZ Renderzone 2.8," *PC Graphics and Video*, pp. 58–62, (Aug. 1996).

Street, R., "3–D Software for the Newcomer," *A V Video*, pp. 62–67, (Jul. 1996).

Sowizral, H., et al., "Java 3D API Specification," (Aug. 1997).

Tenenbaum, J.M., et al., "IGS: A Paradigm for Integrating Image Segmentation and Interpretation," *Artificial Intelligence Center—Stanford Research Institute*, pp. 504–513.

Binford, T.O., et al., "Image Understanding Via Geometric Models," pp. 364–369, *IEEE*, (1980).

Price, K.E., et al., "Symbolic Matching of Images and Scene Models," pp. 105–112, *IEEE*, (1982).

Amini, A.A., et al., "Representation and Organization of Domain Knowledge in a Blackboard Architecture: A Case Study from Computer Vision," pp. 884–889, *IEEE*, (1987).

Feldman, J.A., et al., "Decision Theory and Artificial Intelligence—A Semantics–Based Region Analyzer," *Artificial Intelligence*, 5:349–371, (1974).

Barrow, H.G., et al., "Representation and Use of Knowledge in Vision," *Stanford Research Institute*.

Nevatia, R., et al., "Description and Recognition of Curved Objects," *Artificial Intelligence*, 8:77–98, (1977).

Parma, C.C., et al., "Experiments in Schema–Driven Interpretation of a Natural Scene," pp. 237–245, *IEEE* (1980).

Hanson, A.R., et al., "Constructing Semantic Models in the Visual Analysis of Scenes," *The Milwaukee Symposium on Automatic Computation and Control*, pp. 97–102.

Shaheen, S.I., et al., "Some Experiments with the Interpretation Strategy of a Modular Computer Vision System," *Pattern Recognition*, 14(1–6): 87–100, (1981).

Levine, M.D., et al., "A Modular Computer Vision System for Picture Segmentation and Tnterpretation," *IEEE Transactions on Pattern Analysis and Machine Intelligence, PAMI–3*(5):540–556, (Sep. 1981).

Levine, M.D., et al., "A Modular Computer Vision System for Picture Segmentation and Interpretation," pp. 522–539, *IEEE*, (1979).

"Nonlinear Video Reigns at NAB," *NewMedia*, pp. 21–29, (Jun. 1996).

Beale, S., "Media Components Come Together," www.macworld.com, pp. 56–57, (Nov. 1996).

SCENE MODEL                40

SPATIAL REFERENCE          41
    VISUAL COORDINATE SYSTEM          41-1
    ABSTRACT COORDINATE SYSTEM         41-2

OBJECT LIST                43
    IMAGE-BASED OBJECT 1               50-1
    IMAGE-BASED OBJECT 2               50-2
    IMAGE-BASED OBJECT h               50-h
        IMAGE-BASED OBJECT h-1         (REGION 1)   } 50

IMAGE-BASED OBJECT h-j         (REGION j)

IMAGE-BASED OBJECT i               50-i

ABSTRACTION-BASED OBJECT 1         60-1
    ABSTRACTION-BASED OBJECT 2         60-2
    ABSTRACTION-BASED OBJECT h         (PERSON) 60-h
        ABSTRACTION-BASED OBJECT h-1 (ARMS)   } 60
        ABSTRACTION-BASED OBJECT h-2 (HEAD)
        ABSTRACTION-BASED OBJECT h-3 (LEGS)
        ABSTRACTION-BASED OBJECT h-4 (TORSO)

ABSTRACTION-BASED OBJECT           60-j

LIGHT OBJECT          · · · 74
    CAMERA OBJECT         · · · 75
    VIEWING OBJECT        · · · 76    } 70
    PATH OBJECT           · · · 77
    OPERATION OBJECT      · · · 78
    PROXY OBJECT          · · · 79

CORRELATION MESH
    IMAGE-BASED OBJECT u: ABSTRACTION-BASED OBJECT v  80-1
    IMAGE-BASED OBJECT w: ABSTRACTION-BASED OBJECT x  80-2   } 80

IMAGE-BASED OBJECT y: ABSTRACTION-BASED OBJECT z  80-c

*Figure 7*

MEDIA PRODUCTION WITH CORRELATION OF IMAGE STREAM AND ABSTRACT OBJECTS IN A THREE-DIMENSIONAL VIRTUAL STAGE

RELATED APPLICATION

This application claims priority to U.S. Provisional application Ser. No. 60/043,075, filed Apr. 7, 1997, the entire teachings of which are incorporated herein by reference.

BACKGROUND OF THE INVENTION

Media productions such as motion pictures, television shows, television commercials, videos, multimedia CD-ROMs, web productions for the Internet/intranet, and the like have been traditionally created through a three-phase process: pre-production 11, production 12, 13 and post-production 14 as illustrated in FIG. 1. Pre-production 11 is the concept generation and planning phase. In this phase, scripts and storyboards are developed, leading to detailed budgets and plans for production 12, 13 and post-production 14. Production 12, 13 is the phase for creating and capturing the actual media elements used in the finished piece. Post-production combines and assembles these individual elements, which may have been produced out of sequence and through various methods, into a coherent finished result using operations such as editing, compositing and mixing.

During the production phase, two distinct categories of production techniques can be used, live/recorded production 12 and synthetic production 13.

The first category, "live/recorded media production 12", is based on capturing images and/or sounds from the physical environment. The most commonly used techniques capture media elements in recorded media formats such as film, videotape, and audiotape, or in the form of live media such as a broadcast video feed. These media elements are captured through devices like cameras and microphones from the physical world of actual human actors, physical models and sets. This requires carefully establishing and adjusting the lighting and acoustics on the set, getting the best performance from the actors, and applying a detailed knowledge of how the images and sounds are captured, processed and reconstructed.

As live/recorded media elements are captured, they are converted into sampled representations, suitable for reconstruction into the corresponding images and sounds. Still images are spatially sampled: each sample corresponds to a 2D region of space in the visual image as projected onto the imaging plane of the camera or other image capture device. Note that this spatial sampling is done over a specific period of time, the exposure interval. Audio is time-sampled: each sample corresponds to the level of sound "heard" at a specific instance in time by the microphone or other audio capture device. Moving images are sampled in both space and time: creating a time-sampled sequence of spatially-sampled images, or frames.

Sampled media elements can be represented as analog electronic waveforms (e.g. conventional audio or video signals), digital electronic samples (e.g. digitized audio or video), or as a photochemical emulsion (e.g. photographic film). The sampled live/recorded media elements are reconstructed as images or sounds by reversing the sampling process.

The second category of production techniques, synthetic media production 13, uses computers and related electronic devices to synthetically model, generate and manipulate images and sounds, typically under the guidance and control of a human operator. Examples of synthetic media production include computer graphics, computer animation, and synthesized music and sounds. Synthetic media uses synthetic models to construct a representation inside a computer or other electronic system, that does not exist in the natural physical world, for output into a format that can be seen or heard. Synthetic images are also called computer-generated imagery (CGI).

Synthetic media models are mathematical, geometric, or similar conceptual structures for generating images and/or sounds. They can be represented in software, hardware (analog circuits or digital logic), or a combination of software and hardware. These models specify, explicitly or implicitly, sequences of electronic operations, digital logic, or programmed instructions for generating the media elements, along with their associated data structures and parameters.

Synthetic media models are converted into actual images or sounds through a synthesis or "rendering" process. This process interprets the underlying models and generates the images and/or sounds from the models. Unlike sampled media elements, a synthetic media element can generate a wide range of different but related images or sounds from the same model. For example, a geometric model can generate visual images from different viewpoints, with different lighting, in different sizes, at different resolutions (level of detail). A synthetic musical composition can generate music at different pitches, at different tempos, with different "instruments" playing the notes. In contrast, live/recorded media elements can only reconstruct images or sounds derived from the samples of the original captured image or sound, though perhaps manipulated as, for example, for optical effects.

Creating synthetic models can be very labor-intensive, requiring considerable attention to detail and a thorough understanding of the synthetic modeling and rendering process. Synthetic models can be hierarchical, with multiple constituent elements. For example, a synthetic model of a person might include sub-models of the head, torso, arms and legs. The geometric, physical, acoustical and other properties, relationships and interactions between these elements must be carefully specified in the model. For animated synthetic media elements, the models typically include "motion paths": specifications of the model's movement (in 2D or 3D) over time. Motion paths can be specified and applied to the entire model, or to different constituent parts of hierarchical models.

To increase the perceived realism of a rendered synthetic element, the structure of a synthetic model may incorporate or reference one or more sampled media elements. For example, a synthetic geometric model may use sampled image media elements as "texture maps" for generating surface textures of the visual image (e.g. applying a sampled wood texture to the surfaces of a synthetic table). In a similar manner, sampled sound elements can be used to generate the sounds of individual notes when rendering a synthetic model of a musical composition. Within synthetic media production, there is an entire sub-discipline focused on capturing, creating and manipulating these sampled sub-elements to achieve the desired results during rendering. (Note that these sampled sub-elements may themselves be renderings of other synthetic models.)

Synthetic media is based on abstract, hierarchical models of images and sounds, while live/recorded media is based on sampled representations of captured images and sounds. Abstract hierarchical models allow synthetic media elements to incorporate sub-elements taken from live/recorded media. However, the reverse is not possible. The sampled representation of a live/recorded media cannot include a synthetic model as a sub-element. This is the key difference between reconstructing a live/recorded media element from its samples, and rendering a synthetic media element from its model.

While synthetic media elements are arguably more versatile than live/recorded media elements, they are limited in modeling and rendering truly "realistic" images and sounds. This is due to the abstract nature of the underlying synthetic models, which cannot fully describe the details and complexities of the natural world. These limitations are both theoretical (some natural phenomena cannot be described abstractly) and practical. The time, effort and cost to model and render a highly realistic synthetic media element can vastly outweigh the time, effort and cost of capturing the equivalent real image or sound.

Because a sampled media element has a very simplified structure (a sequence of samples) and contains no abstract hierarchical models, the process of capturing and then reconstructing a sampled media element is typically very efficient (usually real-time) and relatively inexpensive. In comparison, the process of modeling and then rendering a synthetic media element can be very time-consuming and expensive. It may take many minutes or hours to render a single synthetic visual image using modern computer-based rendering systems. Properly modeling a synthetic visual element might take a skilled operator anywhere from several minutes, to hours or weeks of time.

In summary, the processes and techniques used in synthetic media production 13 are very different from those used in live/recorded media production 12. Each produces media elements that are difficult, costly or even impossible to duplicate using the other technique. Synthetic media production 13 is not limited or constrained by the natural physical world. But synthetic techniques are themselves limited in their ability to duplicate the natural richness and subtle nuances captured in live/recorded media production 12.

Therefore, it has become highly advantageous to combine both types of production techniques in a media production. Each technique can be used where it is most practical or cost effective, and combinations of techniques offer new options for communication and creative expression.

Increasingly, producers and directors of media productions are creating scenes where multiple elements (synthetic and/or live/recorded elements) appear to be interacting with each other, co-existing within the same real or imagined space. They also want to apply synthetic techniques to manipulate and control the integration of separately produced live/recorded media elements. These new techniques can create attention-grabbing special effects: synthetic dinosaurs appearing to interact with human actors, synthetic spaceships attacking and destroying familiar cities, the meow of a cat replaced by the simulated roar of a dozen lions. There is also growing demand for more subtle, barely noticeable, alterations of reality: an overcast day turned into bright sunlight, scenery elements added or removed, or seamless replacements of objects (e.g. a can of soda held by an actor replaced with a different brand).

These "hybrid" media productions require combining separately produced media elements as if they were produced simultaneously, within a single common physical or synthetic space. This includes the need for bridging between production techniques that are done separately and independently, perhaps with entirely different tools and techniques. The requirements of hybrid productions place new requirements on all three phases of the production process (pre-production 11, production 12, 13, and post-production 14) that are time-consuming, labor-intensive and costly. In pre-production 11, careful planning is required to ensure that all media elements will indeed look as if they belong in the same scene. During production 12, 13, media elements must be created that appear to co-exist and interact as if they were captured or created at the same time, in the same space, from the same viewpoint. In post-production 14, the elements need to be combined (or "composited") to generate believable results: by adjusting colors, adding shadows, altering relative sizes and perspectives, and fixing all of the inevitable errors introduced during independent and often very separate production steps.

In some hybrid productions, the same object is represented as both a live/recorded and a synthetic media element. This allows the different representations to be freely substituted within a scene. For example, a spaceship might be captured as a live/recorded media element from an actual physical model and also rendered from a synthetic model. In shots where complex maneuvering is required, the synthetic version might be used, while the captured physical model might be used for detailed close-ups. The transitions between the physical and synthetic versions should not be noticeable, requiring careful matching of the geometry, textures, lighting and motion paths between both versions which have been produced through entirely separate processes.

These new requirements for hybrid productions require a new approach to the tools and processes used in media production. Today, the task of combining different media elements is commonly done through editing, layered compositing and audio mixing. All are typically part of the post-production process (or the equivalent final stages of a live production).

In today's process, each visual media element is treated as a sequence of two-dimensional images much like a filmstrip. Each audio element is treated as much like an individual sound track in a multi-track tape recorder. Live/recorded media elements can be used directly in post-production, while synthetic media elements must first be rendered into a format compatible with the live/recorded media elements.

Editing is the process of sequencing the images and sounds, alternating as needed between multiple live/recorded media elements and/or rendered synthetic elements. For example, an edited sequence about comets might start with an recorded interview with an astronomer, followed by a rendered animation of a synthetic comet, followed by recorded images of an actual comet. In editing, separate media elements are interposed, but not actually combined into a single image.

Layered compositing combines multiple visual elements into a single composite montage of images. The individual images of a visual media element or portions thereof are "stacked up" in a series of layers and then "bonded" into a single image sequence. Some common examples of layered compositing include placing synthetic titles over live/recorded action, or placing synthetic backgrounds behind live actors, the familiar blue-screen or "weatherman" effects. More complex effects are built up as a series of layers, and individual layers can be manipulated before being added to the composite image.

Audio mixing is similar to layered compositing, mixing together multiple audio elements into a single sound track which itself becomes an audio element in the final production.

Today's editing, mixing and layered compositing all assume a high degree of separation between live/recorded 12 and synthetic 13 production processes, waiting until post-production to combine the synthetic elements with the live/recorded elements. Since editing is inherently a sequencing operation, there are few problems introduced by the separation during production of live/recorded and synthetic elements.

However, the techniques used in layered compositing place severe restrictions on how different visual elements can be combined to achieve realistic and believable results. Building up an image sequence from multiple layers introduces a "layered look" into the finished material. It becomes very difficult to make the various media elements appear to "fit in" within composited images, as if they all co-existed in the same physical space. Differences in lighting and textures can be very apparent in the composited result.

Making the media elements appear to actually interact with each other adds additional levels of complexity. In a layered technique, the different media elements are necessarily in distinct layers, requiring considerable manual intervention to make them appear to realistically interact across their respective layers. If objects in different layers are moving in depth, layers must be shuffled and adjusted from frame to frame as one object moves "behind" the other, and different parts of each object must be adjusted to appear partially occluded or revealed. When this technique produces unacceptable results, the operator must attempt further iterations, or resort to manually adjusting individual pixels within individual frames, a process called "painting," or accept a lower quality result.

Substituting between different versions of the same object, which may include both live/recorded version(s) and rendered synthetic version(s), is equally difficult. This type of substitution should appear to be seamless, requiring careful and detailed matching between the "same" elements being mixed (or dissolved) across separate compositing layers. The human eye and ear are very sensitive to any abrupt changes in geometry, position, textures, lighting, or acoustic properties. Making the substitution look right can require multiple trial-and-error iterations of synthetic rendering and/or layered compositing.

These problems result from the traditional separation between live/recorded production 12 and synthetic production 13, along with the traditional separation of both types of production from the post-production process 14. Today, both types of production generate a sequence of flattened two-dimensional images taken from a specific viewpoint. Only the final sequences of 2D images are taken into the post-production process 14.

Even though the physical set of a live/recorded production 12 is inherently three-dimensional, the captured result is a 2D image from the camera's perspective. Similarly, many synthetic media tools are based on computer-generated 3D geometry but the resultant images are rendered into sequences of 2D images from the perspective of a "virtual camera". Any information about the relative depths and physical (or geometric) structure of objects has been lost in the respective imaging processes. There is little or no information about the relative position and motion of objects, of their relationships to the imaging viewpoint, or of the lighting used to illuminate these objects.

Then, in post-production 14, these 2D image sequences must be artificially constructed into simulated physical interactions, believable juxtapositions, and three-dimensional relative motions. Since the different visual elements were created at different times, often through separate and distinct processes, and exist only as sequences of 2D flattened images, this is extremely challenging.

Overcoming these problems using layered compositing is labor-intensive, time consuming and expensive. The images to be manipulated must be individually captured or created as separate layers, or separated into layers after production using techniques such as matting, image tracking, rotoscoping and cut-and-paste. Complex effects require dozens or even hundreds of separate layers to be created, managed, individually manipulated and combined. Information about depths, structures, motions, lighting and imaging viewpoints must be tracked manually and then manually reconstructed during the compositing process.

Interactions between objects must be done individually on each object within its own layer, with three-dimensional motions and interactions adjusted by hand. Manual labor is also required to simulate the proper casting of shadows, reflections and refractions between objects. These are also typically created by hand on every affected layer on every individual frame.

Consider a scene where a recorded actor grabs a synthetic soda can and throws it into a trash barrel. In each frame, the position of every finger of the hand needs to be checked and adjusted so that it appears to wrap around the soda can. The synthetic soda can has to show through the space between the fingers (but not "bleed through" anywhere else), and move as if it were being picked up and tossed out. As the can travels to the trash barrel, it must properly occlude various objects in the scene, cast appropriate shadows in the scene, land in the barrel, and make all the appropriate sounds.

The common solution to many of these problems is to separate each of the affected images into its own image layer, and then individually paint and/or adjust each of the affected images within each and every one of the affected layers. This involves manual work on each of the affected layers of the composited image, often at the level of individual pixels. In a feature film, each frame can have up to 4,000 by 3,000 individual pixels at a typical frame rate of 24 frames per second. In a TV production, at about 30 frames per second, each frame can have approximately 720 by 480 individual pixels. The required manual effort, and artistic skill, can result in man-months of work and tens of thousands of dollars expended in post-production 14.

Similar problems exist in audio mixing. The human ear is very sensitive to the apparent "placement" of sounds so that they correspond with the visual action. In a visual image produced with layered compositing, the movement of objects in the composited scene needs to be reflected in the audio mix. If an object goes from left to right, forward to back, or goes "behind" another object, the audio mix needs to reflect these actions and resulting acoustics. Today, all of this is done primarily through manual adjustments based on the audio engineer viewing the results of layered compositing. If the layered composite is altered, the audio must be re-mixed manually.

If the result is not acceptable, which is often the case, the same work must be done over and over again. The process becomes an iterative cycling between synthetic rendering, layered compositing (or audio mixing) and pixel painting (or adjusting individual audio samples) until the result is acceptable. In fact, for a high quality production, the iterations may include the entire project, including reconstruction and reshooting a scene with live action.

SUMMARY OF THE INVENTION

Rather than working solely with flattened two-dimensional (2D) images that can only be combined using 2D techniques, the invention allows the application of both three-dimensional (3D) and 2D techniques for integration of different media elements within a common virtual stage. To that end, the 3D characteristics of live/recorded elements are reconstructed for use in the virtual stage. Similarly, 3D models of synthetic objects can be directly incorporated into the virtual stage. In that virtual stage, 3D representations of both physical and synthetic objects can be choreographed, and the resulting 2D images may be rendered in an integrated fashion based on both 3D and 2D data.

Accordingly, the present invention utilizes a data processing system in media production. Representations of objects, including representations derived from at least one image stream captured from physical objects, are provided in a three-dimensional virtual stage. A correlation is maintained between representations of objects in the virtual stage and corresponding segments of the at least one image stream. Representations of objects are choreographed within the virtual stage, and a choreography specification is provided for generation of a two-dimensional image stream of the choreographed objects within the virtual stage.

Representations of objects in the virtual stage include both 3D representations of physical objects and 3D representations of synthetic objects. 2D representations of these and other objects on the stage may also be included.

Representations of a virtual camera and lighting corresponding to the camera and lighting used to capture the image stream from the physical objects can also be provided as objects in the virtual stage, and the positions and orientations of the virtual camera and virtual lighting can be manipulated within the virtual stage.

A 3D path within the virtual stage may represent the motion associated with at least one feature of an object represented in the virtual stage. Control over interobject effects, including shadows and reflections between plural objects represented in the virtual stage, may be included in the choreography specification.

Abstract models may be used partially or completely as proxies of physical objects. In generating the 2D image stream, details for the physical objects can be obtained directly from the original captured image stream. Similarly, the details of previously rendered synthetic objects can be used in generating the 2D image stream.

After the choreography and generation of a 2D image stream, a new image stream may be captured from the physical objects in a "reshooting" to provide image data which corresponds directly to the choreographed scene. Similarly, new representations of synthetic objects may be generated and provided to the system.

To assist in choreography, displays are provided both of a 3D representation of the physical and synthetic objects within the virtual stage and of a 2D preview image stream. Preferably, the 3D representation may be manipulated such that it can be viewed from a vantage point other than a virtual camera location. A timeline display includes temporal representations of the choreography specification. A textual object catalog of physical and synthetic objects within the virtual stage may also be included in the display. Preferably, representations of physical objects and synthetic objects are object oriented models.

The preferred system also associates audio tracks with the rendered 2D image stream. Those audio tracks may be modified as the step of manipulating the representations of physical objects and synthetic objects changes acoustic properties of the set.

Numerous abstract models are supported in the virtual stage. They include abstract models of multiple physical objects, abstract models of synthetic objects (e.g., two-dimensional models, three-dimensional models, volumetric models, procedural models, physically-based models), an abstract model of the camera's position and orientation and any movement or change in orientation or other parameters over time, an abstract model of the lighting used to illuminate the physical or synthetic scene and any movements or changes in orientation or other parameters over time, and an abstract model of the acoustics to support audio tracks and the correlation of the audio with a three-dimensional path.

The system provides an integrated environment on a computer system that includes a representation of the three-dimensional virtual stage, a representation of the choreography specification, and a catalog of image streams, abstract models of physical objects, and/or abstract models of synthetic objects. The system offers the ability to generate the two-dimensional images from some combination of the choreography specification, the abstract model(s) and the two-dimensional pixel representation(s), either during the choreography process or at any time after the choreography process. A preview window included within the integrated environment offers a two-dimensional rendered display of the three-dimensional virtual stage from the viewpoint of a specified virtual camera based on some combination of the choreography specification, the abstract model(s) and the pixel representation(s). There is also the ability to have the rendered results in the two-dimensional preview window at different levels of quality and/or resolution based on user control. An automated process generates lower levels of quality and/or resolution in the preview window to maintain high levels of interactive responsiveness, and then successively generating images of higher quality and/or resolution which can be displayed when high levels of interactive responsiveness are not required.

The choreography specification may be provided in a human-readable form for use, review and/or modification inside and/or outside the integrated environment. The choreography specification may be provided in a machine-readable form, capable of being copied, shared and/or transmitted through any physical media or network or communications media.

The system may create and maintain multiple choreography specifications and/or multiple versions of the same choreography specification that share one or more portions of the correlation database(s), abstract model(s), pixel representation(s), and/or image stream(s).

The system may create and maintain multiple versions of image stream(s) and/or pixel representations (e.g., different levels of image resolution, different levels of image detail, different color space representations) and allow automatic and/or user-controlled determination of which version to use for generating an interactive display of intermediate results from choreography operations and/or manipulations. The system allows automatic and/or user-controlled synchronization for applying the same set of operations and/or manipulations in the choreography specification to one or more corresponding versions either simultaneously or delayed in time.

The system may create and maintain multiple versions of abstract models (e.g., different levels of geometry detail, different representations of surface textures) and allow automatic and/or user-controlled determination of which version to use for generating an interactive display of intermediate results from choreography operations and/or manipulations. The system allows automatic and/or user-controlled synchronization for applying the same set of operations and/or manipulations in the choreography specification to one or more corresponding abstract model versions either simultaneously or delayed in time.

The user may specify and control during the choreography process the creation of a two-dimensional geometric path that represents the motion in image-space associated with one or more specified features of pixel representations that have been correlated across successive frames in an image stream. The user may specify and control during the choreography process the parameters for an automated procedure that projects a two-dimensional path derived from analysis of movements in image-space into the related three-dimensional path within the three-dimensional virtual stage. The user may specify and control during the choreography process the creation of a three-dimensional geometric path that represents the motion associated with one or more specified features of an abstract model in the three-dimensional virtual stage. The user may specify and control during the choreography process the assignment of a three-dimensional path to an abstract model in the three-dimensional virtual stage, such that the movement of one abstract model tracks the movement of another abstract model.

The user may specify and control during the choreography process the parameters for the static and/or dynamic alteration of an abstract object's surface textures and other surface characteristics such as reflectivity and opacity. The user may specify and control during the choreography process the parameters for an automated process that generates inter-object effects such as shadows, reflections and refractions among and between multiple abstract models represented in the three-dimensional virtual stage. The user may specify and control during the choreography process the parameters for an automated process that generates spatial and/or atmospheric distortions and/or effects such as fog, fire and underwater distortion that alters the generation of two-dimensional images from one or more abstract models represented in the three-dimensional virtual stage. The user may specify and control during the choreography process the parameters of an automated process that alters and/or distorts some or all of the geometric and/or volumetric characteristics of an abstract model, or selected portions of an abstract model, in the three-dimensional virtual stage either statically or dynamically over a specified sequence of time.

The user may specify and control during the choreography process the parameters for an automated inter-object "morphing" process that alters and/or distorts some or all of the geometric and/or volumetric characteristics of an abstract model, or selected portions of an abstract model, in the three-dimensional virtual stage across a specified sequence of time such that the final result matches specified geometric and/or volumetric characteristics of a second abstract model or specified portion thereof and that the intermediate results appear to be a gradual transformation from the first abstract model (or portion thereof) to the second (or portion thereof).

The system provides a mechanism to allow the addition of other capabilities to the choreography process by providing an application programming interface that provides access to some or all aspects of the choreography specification, correlation database, abstract model(s), pixel representation(s) and/or image stream(s).

What is provided is a way to combine media elements not only in the sense that they may be edited in time sequence, but also in a way that they can be integrated with one another spatially and acoustically. This is done in such a way so that different media elements can be combined, correlated, and registered against each other so that they fit, sound and look to the viewer as though they were created simultaneously in the same physical space.

Furthermore, an overall conceptual view of the production remains up to date, integrated and available for review throughout the production and post-production process. This is possible despite the fact that many separate and different production processes may be occurring at the same time. In this manner, control can be better maintained over the integration of the various production segments. The objective is to greatly reduce or eliminate today's process of continuous cycling between synthetic rendering, layered compositing (or audio mixing) and pixel painting (or sound shaping) until the desired result is achieved.

The invention provides a technique for combining live/recorded and/or synthetic media elements during pre-production, production and post-production through the use of a unifying three-dimensional virtual stage; a common method of specifying spatial, temporal, and structural relationships; and a common, preferably object-oriented, database. Using this technique, different types of media elements can be treated as if they were produced simultaneously within the unified three-dimensional virtual stage. The relationships and interactions between these media elements are also choreographed in space and time within a single integrated choreography specification framework. All relevant information about the different media elements, their structures and relationships is stored and accessible within a common object-oriented database: the object catalog.

By combining media elements within this unified 3D environment, many of the problems of today's production and post-production process are greatly reduced or eliminated. The new technique postpones the "flattening" of synthetic media elements into 2D sampled representations. It also reconstructs the 3D characteristics of live/recorded media elements. This avoids the labor-intensive and error-prone process of creating simulated 3D movements and interactions through traditional 2D layered compositing, painting and audio mixing techniques. Instead, the virtual 3D environment directly supports both live/recorded and synthetic media elements as abstract models with geometric, structural and motion path attributes. These models are placed into the simulated 3D physical space of the set or location where the live/recorded elements are (or were) captured. The combinations and interactions of media elements are choreographed in this unified 3D space, with the rendering and "flattening" done on the combined results.

The preferred technique is divided into three major processes: analysis, choreography and finishing. Analysis is the process of separating live/recorded media elements into their constituent components, and deriving 2D and 3D spatial information about each component. Analysis is typically done on streams of sampled visual images, where each image corresponds to a frame of film or video, using various combinations of image processing algorithms. Analysis can also be done on image streams rendered from synthetic models, in order to "reverse" the rendering process. Finally, analysis can also be done on streams of audio samples, using various combinations of signal processing algorithms.

In the analysis step, the position, motion, relative depth and other relevant attributes of individual actors, cameras, props and scenery elements can be ascertained and placed into a common database for use in the choreography and finishing steps. Parameters of the camera and/or lighting can also be estimated in the analysis step, with these represented as objects with 3D characteristics. Analysis enables the creation of the virtual stage within which multiple live/recorded and/or synthetic elements share a common environment in both time and space. Analysis is a computer-assisted function, where the computational results are preferably guided and refined through interaction with the user (human operator). The level of analysis required, and the type and number of data and objects derived from analysis, is dependent on the specific media production being created.

The "scene model" is a 3D model of the objects represented in the visual stream being analyzed, along with their dynamics. It is based on a combination of any or all of the following: 1) the analysis step, 2) 3D models of objects represented in the visual stream, and 3) information, parameters and annotations supplied by the user.

Motion paths in 3D can be estimated for moving actors or other moving physical objects in the scene model, along with estimates of the camera's motion path. These motion paths can be refined by the user, applied to motion or depth mattes, and/or correlated with synthetic motion paths.

The scene model can be used as the basis for creating the 3D virtual stage. Actual cameras on the set are represented as "virtual cameras" using a 3D coordinate reference system established by the scene model. Similarly, "virtual lights" in the 3D virtual stage correspond to actual lights on the set, with their placement calibrated through the scene model. Movements of actors and objects from live/recorded media elements are also calibrated in the virtual stage through the scene model.

As image streams are analyzed into their constituent components, these components can be interpreted as mattes or cutout patterns on the image. For example, a "motion matte" changes from frame to frame based on movement of the physical actors or objects. "Depth mattes" include information about the relative depths of physical objects from the camera, based on depth parallax information. Depth parallax information can be derived either from stereo cameras or from multiple frames taken from a moving camera. A "difference matte" computes the pixel differences between one image and a reference image of the same scene.

The analysis process makes it possible to effectively use live/recorded media elements within the same virtual stage. For example, an actor's motion matte can be separated from the background and placed into the 3D virtual stage relative to the actor's actual position and motion on the physical set. This allows 3D placement of synthetic elements or other live/recorded elements to be spatially and temporally coordinated with the actor's movements. Depth mattes can be used to model the 3D surface of objects. Depth mattes, scene models and the virtual stage can all be used to automate the rendering of shadows and reflections, and calculate lighting and acoustics within the context of the unified virtual stage.

Choreography is the process of specifying the spatial, temporal and structural relationships between media elements within a common unified framework. During choreography, various media elements can be positioned and moved as if they actually exist and interact within the same 3D physical space. Choreography supports the correlation and integration of different synthetic and/or live/recorded elements that may have been produced at different times, in different locations, and with different production tools and techniques. Throughout the choreography step, intermediate rendered versions of the combined media elements can be generated to review and evaluate the choreographed results.

Finishing is the process of finalizing the spatial and temporal relationships between the choreographed media elements, making any final adjustments and corrections to the individual elements to achieve the desired results and from these, rendering the final choreographed images and sounds, and blending and mixing these into a finished piece. The output of the finishing process is typically a set of media elements rendered, blended and mixed into the appropriate format (e.g., rendered 2D visual images, mixed audio tracks), along with the final version of the choreography specification that was used to generate the finished images and sounds. Finishing establishes the final lighting, shadows, reflections and acoustics of the integrated scene. Finishing can also include any adjustments and corrections made directly on the rendered (and mixed) output media elements.

The analysis, choreography and finishing processes are all part of an integrated, iterative process that supports successive refinement of results. It now becomes possible to move back and forth between processes as required, to continuously improve the final result while reviewing intermediate results at any time. This is in contrast to the current sequential, non-integrated approach of separate production processes, followed by rendering of synthetic images and rotoscoping of captured images, followed by layered 2D compositing, followed by 2D painting and audio mixing.

The benefits of an integrated approach for successive refinement can be considerable in terms of reduced costs, increased flexibility, greater communication across team members, higher quality results, and allowing greater risk-taking in creative expression. The finishing step can be enhanced with additional analysis and choreography, based on specific finishing requirements. Choreography can be more efficient and qualitatively improved through early access to certain aspects of finishing, and the ability to return as needed for additional analysis. Both choreography and finishing can provide additional information to guide and improve successive passes through the analysis step.

The successive refinement paradigm is applicable across any or all phases of the production cycle: starting in pre-production, and continuing through both production and post-production. This integrated technique provides a bridge across the separate phases of the production cycle, and between synthetic and live/recorded media production. Critical interactions between separate elements can be tested as early as pre-production, rehearsed and used during both synthetic and live/recorded production, and reviewed throughout the post-production process. This is because the analysis, choreography and finishing steps can applied in each of these phases. Intermediate results and information are continuously carried forward within this new integrated process.

The analysis, choreography and finishing steps add, access and update information via an object catalog, a common object-oriented database containing all data objects. The object catalog permits synthetic media elements to be modeled and created in separate graphics/animation systems. The synthetic models, motion paths, geometric and structural information, and other relevant data can then be imported into the object catalog. Changes made during choreography and finishing can be shared with the graphics/ animation systems, including renderings done either in the finishing step or through external graphics/animation rendering systems. Supplemental information about synthetic elements, supplied by the user during choreography and finishing, are also part of the object catalog common database.

The same object catalog stores information associated with live/recorded media elements, including the information derived through the analysis function. This is supplemented with information and annotations supplied by the user during analysis, choreography and finishing. This supplemental information can include various data and parameters about the set or location: such as lighting, acoustics, and dimensional measurements. Information about the method and techniques used to capture the live/recorded media can also be supplied: camera lens aperture, frame rate, focal length, imaging plane aspect ratio and dimensions, camera placement and motion, microphone placement and motion, etc. These results can be shared with graphics/animation systems through the object catalog.

During choreography and finishing, object catalog data can be used to determine information about lighting, reflections, shadows, and acoustics. Using this information, multiple live/recorded and/or synthetic objects can be choreographed to appear and sound as if they existed in the same physical or synthetic space.

BRIEF DESCRIPTION OF THE DRAWINGS

The above and further features of the invention include various novel details of construction and combination of components. These novel features will now be more particularly pointed out in the following claims, and their advantages will also become evident as they are described in detail with reference to the accompanying drawings, in which:

FIG. 7 is an illustration of an exemplary scene model object.

DETAILED DESCRIPTION OF A PREFERRED EMBODIMENT

Figure 1:
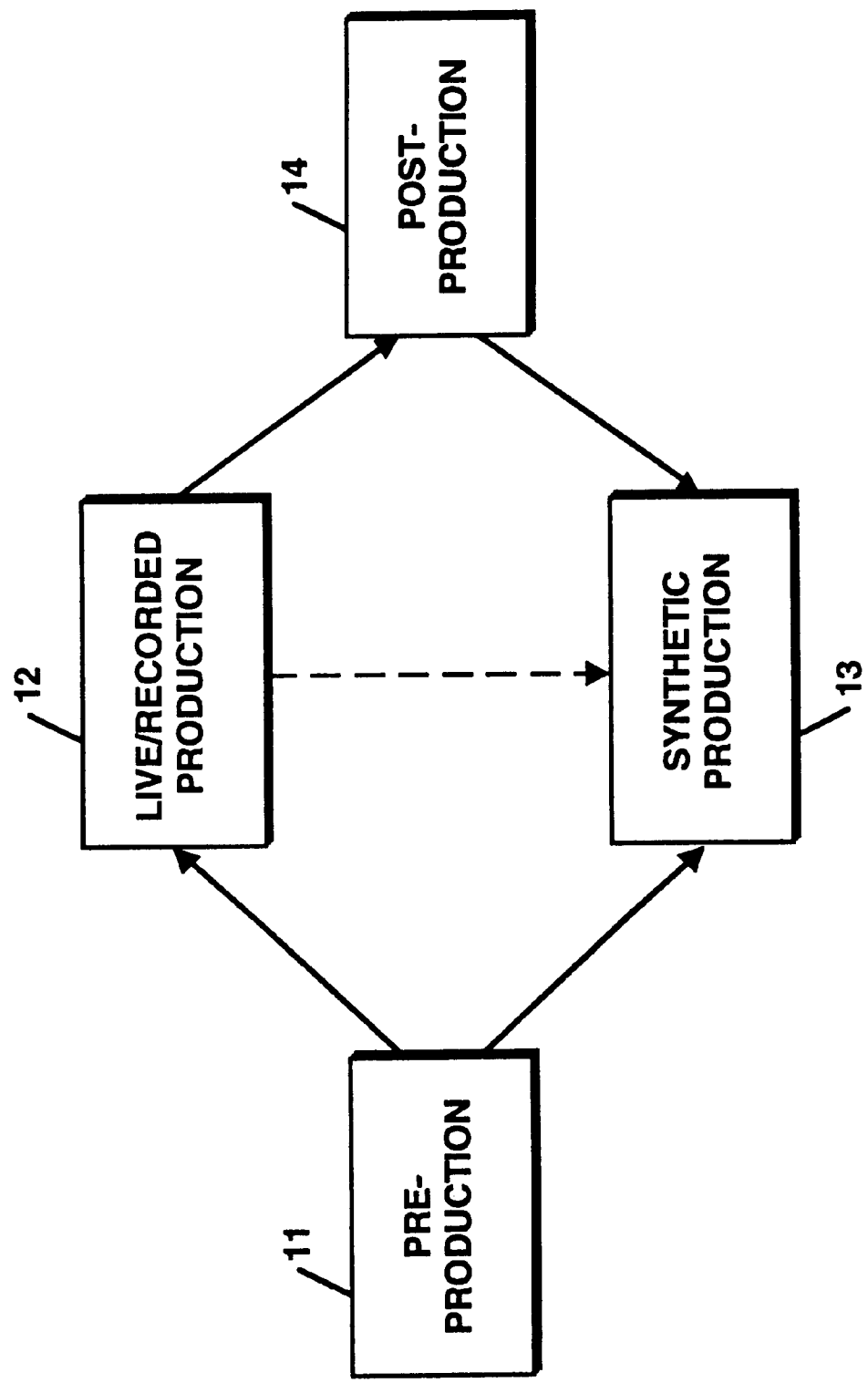
FIG. 1 is a generalized flow diagram of the existing process for production of media segments from multiple live/recorded and synthetic media elements.

As discussed above relative to FIG. 1, the conventional production system 10 consists of a pre-production phase 11, a live/recorded production phase 12, a synthetics production phase 13, and a post production phase 14.

The pre-production phase 11 largely involves visualizing what is to be done in terms of story boards, scripts, set designs, actors, props, animation, graphics and other elements to accomplish the desired production. The pre-production phase 11 results in descriptions of items to be produced as live/recorded media elements (such as film clips, video clips, audio clips and the like) to the live/recorded media production phase 12. Descriptions of graphics, animations, synthesized music or other media elements derived from computer models are provided to synthetic media production 13.

The live/recorded media production phase 12 captures media elements of various types. The media elements may include recorded media formats such as film, video tape, or audio tape or may include live media formats such as broadcast video feeds. Visual media elements are provided as image stills (two-dimensional sampled images) or image streams (a sequential series of two-dimensional sampled images), while sound elements are provided as audio streams (a sequential series of audio samples) to a post-production process 14 as is well known in the prior art.

The synthetic media production phase 13 receives descriptions of graphics, animations, synthesized music, computer models and other synthetic objects from the pre-production phase 11. During synthetic media production 13, automated systems such as three-dimensional computer graphics and animation systems are used to further design, sketch, and refine models of the synthetic visual objects using a computer in terms of abstract geometric, mathematical and structural relationships. Attributes may be assigned to the objects such as textures or motion paths. Similarly, automated systems for producing synthetic audio elements can be used to specify and refine music and sounds in terms of musical notation and abstract models of sonic reproduction. Synthetic media production 13 renders such synthetic elements and objects into the appropriate sampled formats, providing these to the post-production phase 14.

Typically, the only direct connection between the two types of production in FIG. 1 is by providing one or more captured images or sounds from live/recorded production to synthetic production. The captured images can be used as either 2D background plates or sources for sampled textures in synthetic visual production. Captured sounds can be used as sources of sound samples in synthetic audio production. When synthetic elements will be combined with live/recorded elements in post-production 14, the majority of synthetic media production 13 is often done after live/recorded media production 12 has been completed. In these cases, synthetic media production 13 will often overlap in time with post-production 14 where the elements are actually combined.

The post-production phase 14 takes captured live/recorded media elements (from 12) and rendered synthetic media elements (from 13) and applies operations such as editing, compositing and mixing to generate the final production results. Regardless of the production phase source, media elements in conventional post-production 14 are in sampled formats: visual elements are captured or rendered 2D images (image stills or image streams), sound elements are captured or rendered audio streams.

The rendering process at the conclusion of synthetic media production 13 transforms synthetic media elements into sampled representations, so that only sampled representations are used in the post-production phase 14. All combinations of visual elements in the post-production phase 14 are done using 2D sampled images (as they were captured or rendered from a specific place in 3D physical or virtual space). There is no automated method to transfer and use any underlying geometric or spatial models, or any motion paths, created within synthetic media production 13.

Intended interactions between separate 2D sampled visual elements, and any related spatial placement and acoustic adjustment of audio elements, must generally be manually interpreted and constructed from multiple layers of 2D images in post-production 14. Any differences in the way individual media elements were captured or rendered are similarly manually determined and corrected. Corrections and adjustments to individual elements and their combinations can include changes to relative perspective, occlusion, lighting, shadows, reflections or acoustics.

Figure 2:
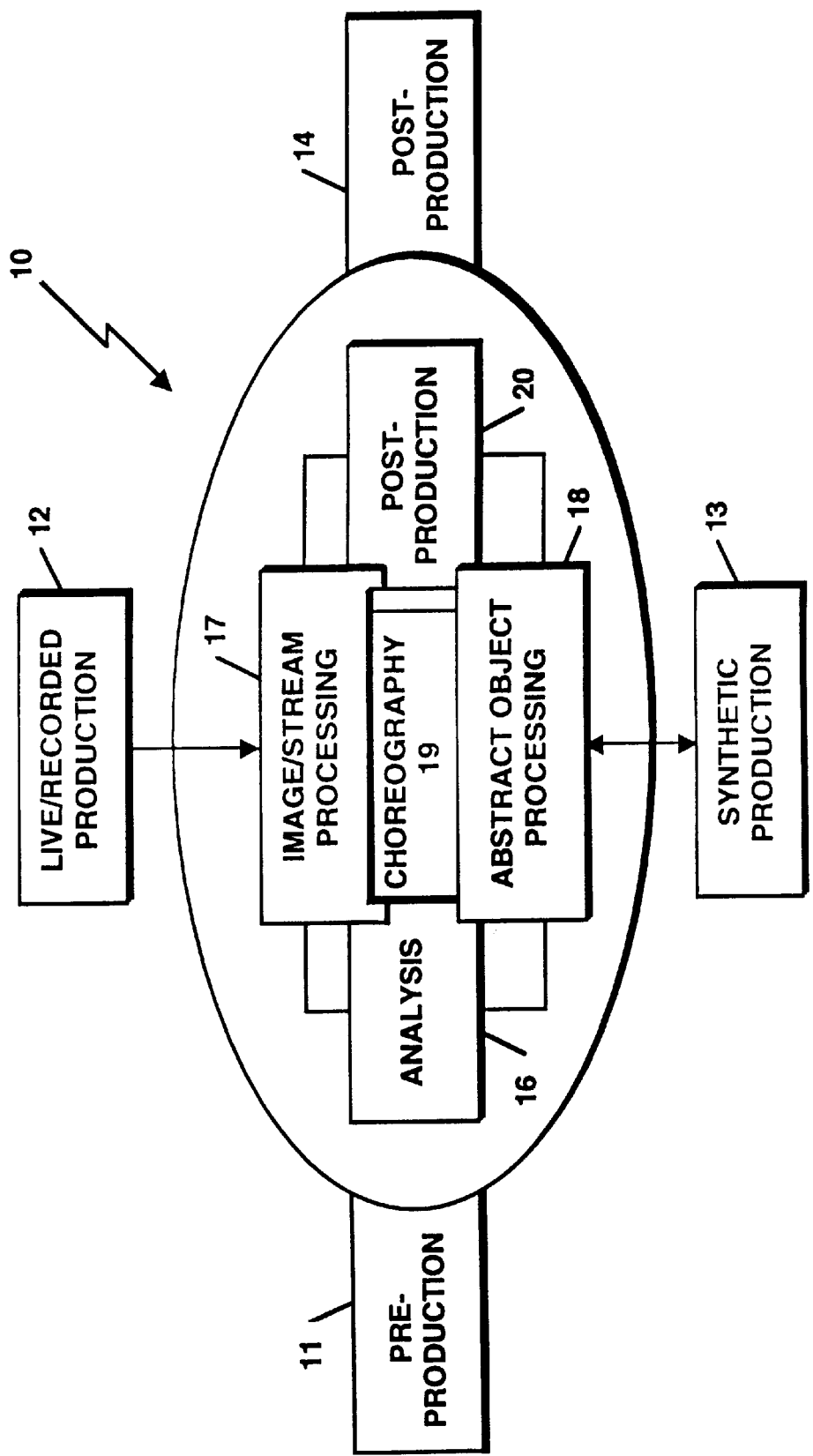
FIG. 2 is a generalized flow diagram of a new process for integrated production of media segments from multiple live/recorded and synthetic elements according to the invention.

FIG. 2 is a generalized process flow diagram of an integrated technique for media production according to the invention. The integration process 15 stretches from the end of pre-production 11 through the beginning of post-production 14, provides a connective bridge between live/recorded media production 12 and synthetic media production 13, and supports new capabilities and increased flexibility during post-production 14.

While the integration process 15 can be used across all of the phases of creating media productions, it can also be applied to any individual phase or combination of phases.

The integration process 15 has five major functions: analysis 16, image/stream processing 17, abstract object processing 18, choreography 19, and finishing 20. In general, image/stream processing 17 provides for actions for capturing, manipulating and playing media elements from live/recorded production 12. Abstract object processing 18 provides functions for the creation, manipulation and rendering of abstract objects. It also provides the interfaces to graphics/animation systems used in synthetic production 13.

Analysis 16 allows the integration process 15 to more effectively incorporate the results of live/recorded media production 12 by extracting information about the visual streams from live/recorded production 12, as captured by image/stream processing 17. This enables the creation of one or more scene models. The information extracted is stored as image-based data objects, abstraction-based data objects and other data objects in the scene model. Objects in the scene model can then be mapped into a virtual stage used in choreography 19 and subsequent finishing 20.

Analysis 16 is a computer-assisted function for deriving information about the 3D structure and temporal dynamics of the physical objects in the scene, about the cameras or other imaging devices used to capture the scene, and about the lighting of the scene. The analysis process 16 creates scene models which can include 3D image-based objects which are models of the physical objects represented in the visual stream, as well as related objects and data such as motion mattes, depth mattes, motion paths and related information from and about media elements captured in live/recorded production 12 such as the camera and lights used. This is done through a combination of image processing algorithms adapted to the requirements of this invention and guided, refined and supplemented through user interactions.

At the heart of the invention is the virtual stage processed by a data processing system. Within the virtual stage, data object representations of both physical and synthetic objects are manipulated and choreographed. Ultimately, the manipulated objects provide the basis for a 2D image sequence output and/or detailed choreography specification.

Figure 3:
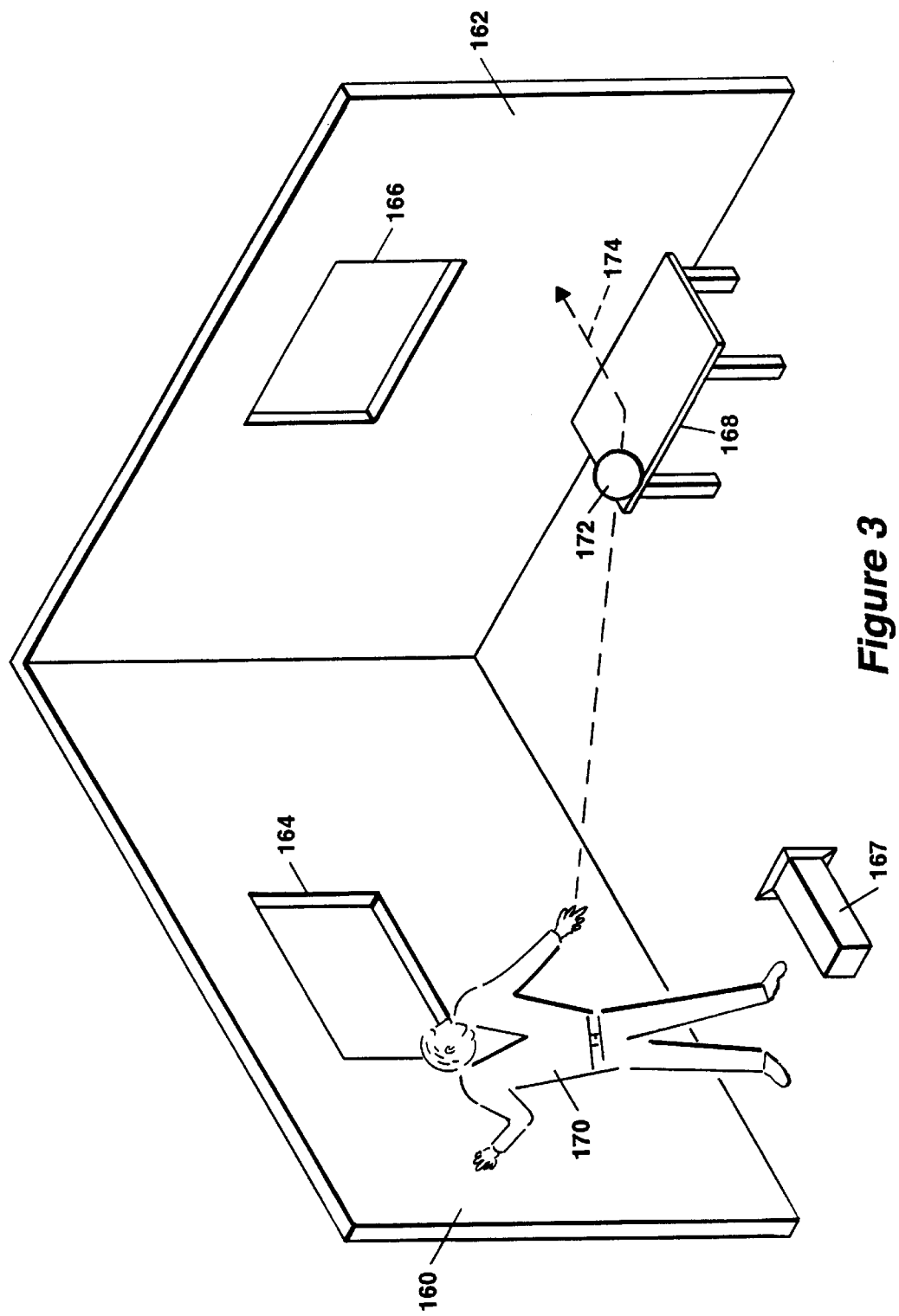
FIG. 3 illustrates physical and synthetic objects within a virtual stage.

An example of the use of a virtual stage is illustrated in FIG. 3. The parameters of the virtual stage are derived from the scene model. One or more parameters captured from the actual physical set, including data relating to the locations and directions of cameras and lighting, may also be stored as data objects in the virtual stage.

In the example of FIG. 3, the virtual stage may be defined by the fixed walls 160 and 162, a window 164 being provided in the wall 160 and a picture 166 hanging on the wall 162. Also included within the virtual stage is the position and location of a virtual camera 167. Also derived from the image stream of the physical environment are a table 168 and an actor 170. To simplify analysis of the 2D image stream, the image based analysis of the table and actor may be supported by abstract object processing 18 and user input. In fact, complete detail within the virtual stage is not required. Abstraction based models having little or no image based input may substitute for the table and actors, at least during early stages of production.

An example of the analysis of image streams to develop a scene model is contained in a copending U.S. Patent Application filed on even date herewith entitled "Adaptive Modeling and Segmentation Of Visual Image Streams," by Paul B. Madden, Philip R. Moorby, John S. Robotham and Jean-Pierre Schott, and assigned to SynaPix, Inc., the assignee of the present invention, and which is incorporated herein by reference.

In this example, the scene which is to be produced includes a ball 172, imported from a synthetic production source, to be thrown by the actor 170 against the top of the table 168 along a path indicated by the broken line 174.

Within the virtual stage, a user, may manipulate the physical and synthetic objects to define a model of a scene, including camera and lighting positions and direction and other aspects of scene production. To that end, a preferred embodiment provides a composite display as illustrated in FIG. 4, although elements of the composite display may be provided on separate display devices or be selected individually, as by menu buttons.

To the upper right of the display at 176 is a display of the virtual stage presented such that it is perceived in three dimensions as in FIG. 3. The user may control the point of view of that virtual stage independent of the location of a virtual camera 167. The virtual camera 167 within the virtual stage corresponds to a camera used to capture the image stream from the physical objects.

Also included is a preview display 178 which presents the scene as it would be captured by the virtual camera 167. To minimize processing time, the preview may include substantially less detail than would be included in the finished 2D media product. However, it provides sufficient detail to enable the user to choreograph multiple physical and/or synthetic objects to obtain the desired result.

Figure 4:
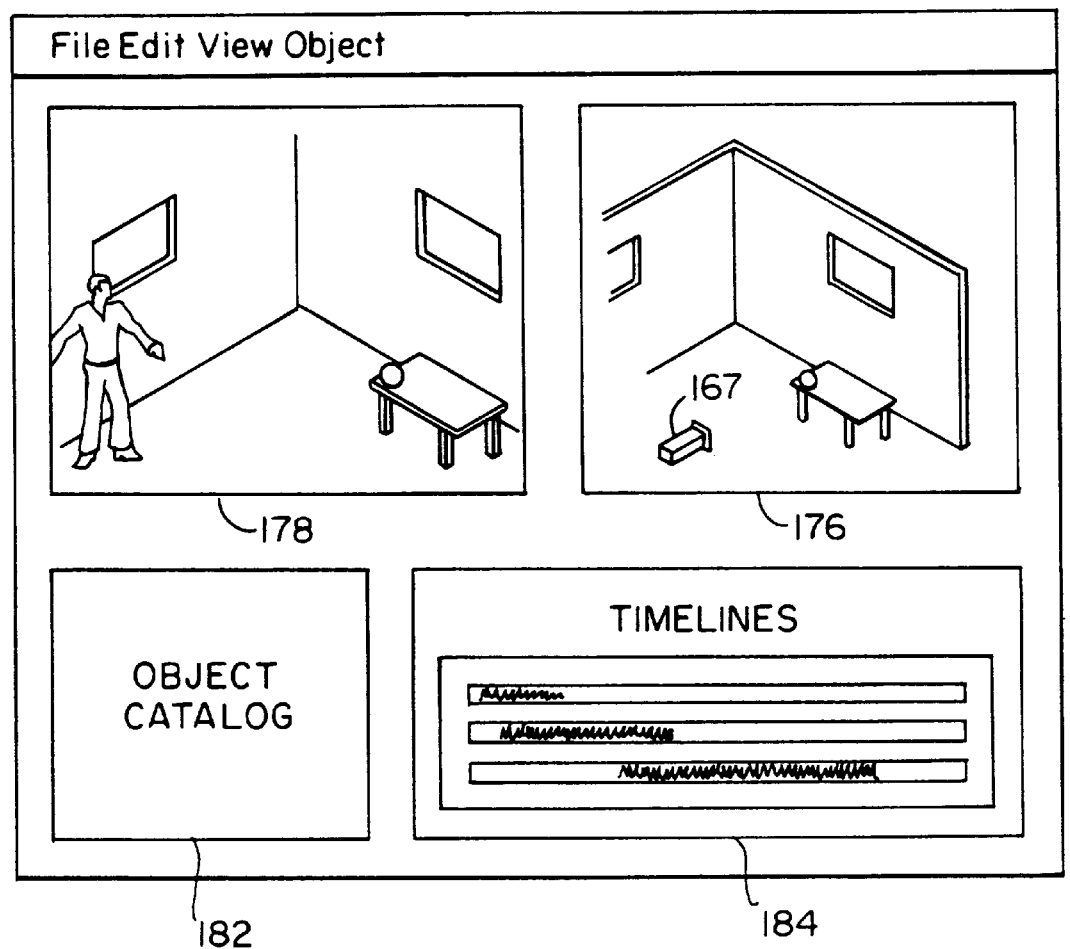
FIG. 4 is a view of a user interface showing a simultaneous view of the scene within the virtual stage, a two dimensional image preview taken from the virtual stage, a timeline representation of the choreography specification, and an Object Catalog.

Also included in the composite display of FIG. 4 is a view of the choreography specification. In the preferred embodiment, this is presented as a hierarchical timeline. This timeline includes a number of tracks 182, each associated with a different object or other aspect of the virtual stage. This enables the user to observe and control the temporal relationships of the various aspects of the scene, including those being viewed in the virtual stage display 176 and preview display 178.

Finally, a composite display includes an object catalog 182 which, in text format, provides relevant information about different media elements within the virtual stage. The object catalog 182 allows the human operator (the user) to obtain information relative to structures and relationships of the various elements within a common object oriented data base.

The integrated system enables the user to view a model of combined objects of either physical and/or synthetic origin at an early stage, even before any images of the physical objects are actually available, thus facilitating not only post-production but also facilitating preproduction and production. During early stages of production, for example, image-based objects can be derived from image streams containing proxy actors who stand in for the more expensive actors who will ultimately perform. In this way, they can be choreographed to a near final product before the final actor is asked to perform. Similarly, synthetic objects, which are also very expensive to develop, can be choreographed using simplified proxies until the full requirements of a complete performance have been determined. Finally, because the final media product may be mostly if not entirely generated from the 3D virtual stage, expensive layering and other post production processes can be avoided.

The information which defines the 3D virtual stage can be generated synthetically from abstract models of the physical scene, or derived from one or more image sequences taken from the physical scene using the scene model of that image sequence, or reflect some combination of both techniques. A scene model defines the relationships between and among image-based representations and 3D abstract object models of objects within the scene along with other information, parameters and annotations supplied by the user or other sensors.

Scene models provide 3D spatial, geometric, texture, lighting and related information about the set or location here each live/recorded media element was captured. The computer processing of scene models using the analysis function 16 can be enhanced and supplemented with set parameters provided by the user. These set parameters may include information concerning the geometry and characteristics of the set (or location) and/or the lighting, cameras, and microphones used during the capture process.

Through the analysis function 16, objects in the scene model can be properly placed into the virtual stage. These objects can then be correlated, manipulated and combined in relation to other objects through the choreography 19 and finishing 20 functions.

Abstract object processing 18 provides, as one of its functions, an interface between the integration process 15 and synthetic media production 13. This interface can be implemented as either a separate module within abstract object processing 18, and/or through one or more software plug-in modules to software packages for synthetic production.

The abstract object processing function 18 imports synthetic models and synthetic motion paths created in a conventional synthetic production 13 as abstract objects into the integration process 15 for use in choreography 19 and finishing 20.

Abstract object processing 18 may also process abstract objects produced by the analysis function 16 from image/stream processing 17. Objects and motion paths created or modified within the integration process 15 can also be exported to synthetic production 13 through the abstract object processing function 18.

The choreography function 19 is for planning and rehearsing the choreographed interactions between multiple live/recorded and/or synthetic media elements. The choreography function 19 can use live/recorded media elements, the image-based objects, and/or the abstraction-based objects derived from these media elements through the analysis function 16. Similarly, the choreography function 19 can use the synthetic models and synthetic motion paths imported and/or created through abstract object processing 18. Choreography 19 is based on combining the unified 3D virtual stage with a common representational framework for specifying the temporal and spatial relationships between all the objects and elements in the media production (the choreography specification).

The finishing function 20 takes the results from the choreography function 19, and previews critical aspects of rendering the combined elements and objects (such as lighting, shadows, reflections, and acoustics) and allows interactive adjustment by the user. The finishing function 20 prepares the choreographed elements and objects for final rendering into sampled representations (2D image streams and audio streams), and performs the required rendering, directly or through separate visual rendering and audio rendering/mixing systems. Any final corrections and adjustments to the rendered results (in their sampled representations) can be made interactively by the user through the finishing function 20. This rendering can be done in a piece-wise fashion, with the finishing providing the capabilities to blend and mix the individually rendered segments into a final finished result.

The output of the finishing function 20 can be sent to the post-production process 14. The finishing function 19 can be done either before or during the post-production process 14. It is intended to supplement and/or replace many of the functions traditionally accomplished in post-production. In some cases, it is possible to completely or partially bypass the traditional post-production process 14 and directly use the results of the finishing function 19 as completed media productions or completed segments of a media production. For a more detailed description of the preferred technique for finishing, refer to our copending U.S. Patent Application filed on even date herewith by John S. Robotham, Michael T. French, and Curt A. Rawley, entitled "An Iterative 3D Process for Creating Finished Media Content," assigned to SynaPix, Inc., the assignee of the present application, which is hereby incorporated by reference.

In some media productions, the creation of the final media product (as seen and/or heard by the ultimate consumer of the end product) is done on a separate computer or computer-based system, possibly under interactive control. In this case, the output of finishing 20 is a suitable form of the choreography specification along with whatever image-based representations and/or abstraction-based objects and models are required, including rendered elements.

Figure 5:
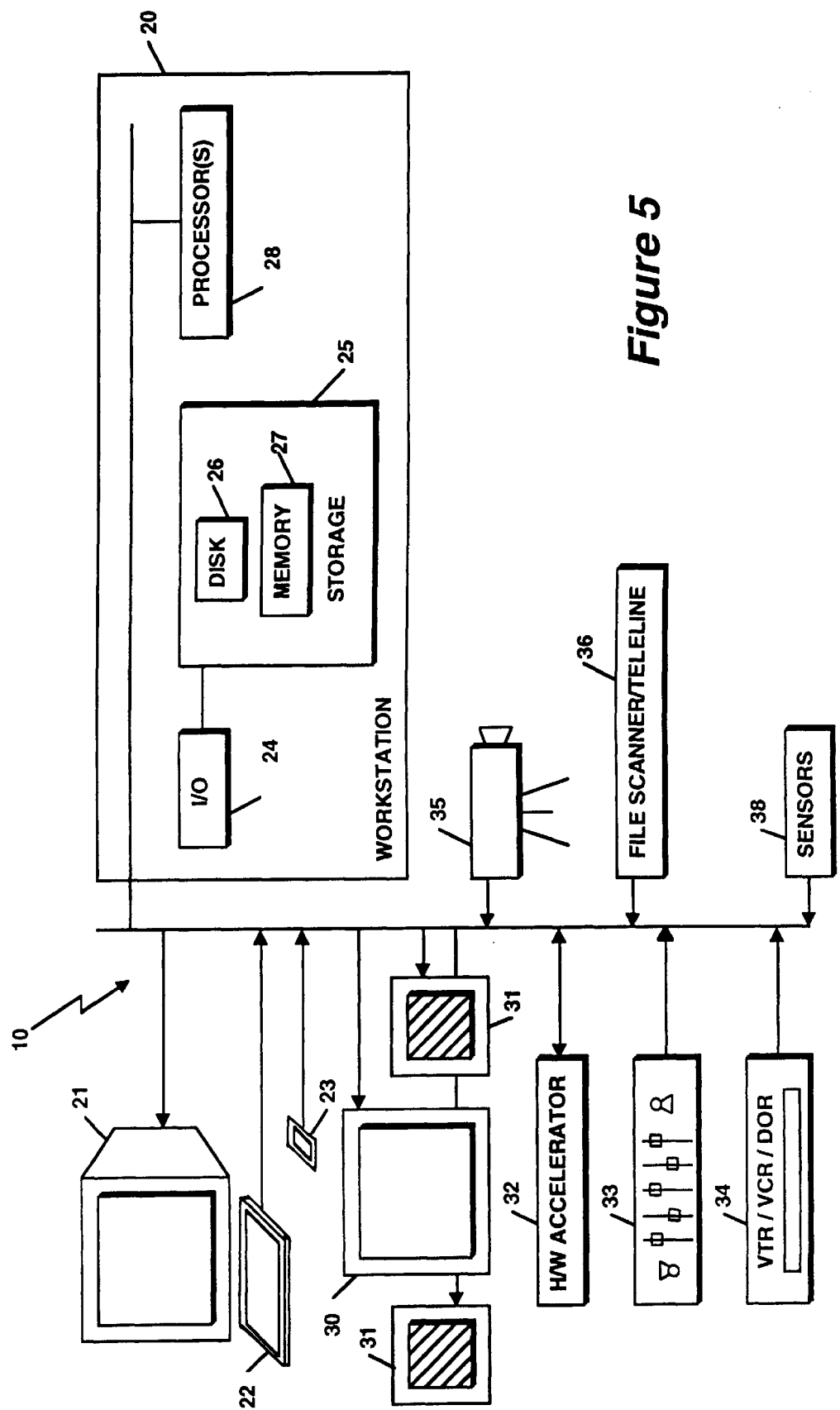
FIG. 5 is a pictorial representation of the hardware elements of the system.

FIG. 5 is a representation of the hardware components of the integrated production system (FIG. 2). The system 10 includes a computer workstation 29, a computer monitor 21, and input devices such as a keyboard 22 and mouse 23. The workstation 29 also includes input/output interfaces 24, storage 25, such as a disk 26 and random access memory 27, as well as one or more processors 28. The workstation 29 may be a computer graphics workstation such as the 02 or Octane workstations sold by Silicon Graphics, Inc., a Windows NT-type workstation or other suitable computer or computers. The computer monitor 21, keyboard 22, mouse 23, and other input devices are used to interact with various software elements of the system existing in the workstation 29 to cause programs to be run and data to be stored as described below.

The system 10 also includes a number of other hardware elements typical of an image processing system, such as a video monitor 30, audio monitors 31, hardware accelerator 32, and user input devices 33. Also included are image capture devices, such as a video cassette recorder (VCR), video tape recorder (VTR), and/or digital disk recorder 34 (DDR), cameras 35, and/or film scanner/telecine 36. Sensors 38 may also provide information about the set and image capture devices.

The manual user interface 23 may contain various input devices such as switches, slides, buttons, joysticks, tablets and the like to permit the manipulation of objects in the integration phase 15. The audio and video monitors 24 and 25 are used to review any combination of audio and visual objects at any time during the integration phase 15. Finally, the hardware accelerator 26 may include equipment to rapidly perform operations to support the analysis 16, and/or choreography 19 and/or finishing 20 functions.

Figure 6:
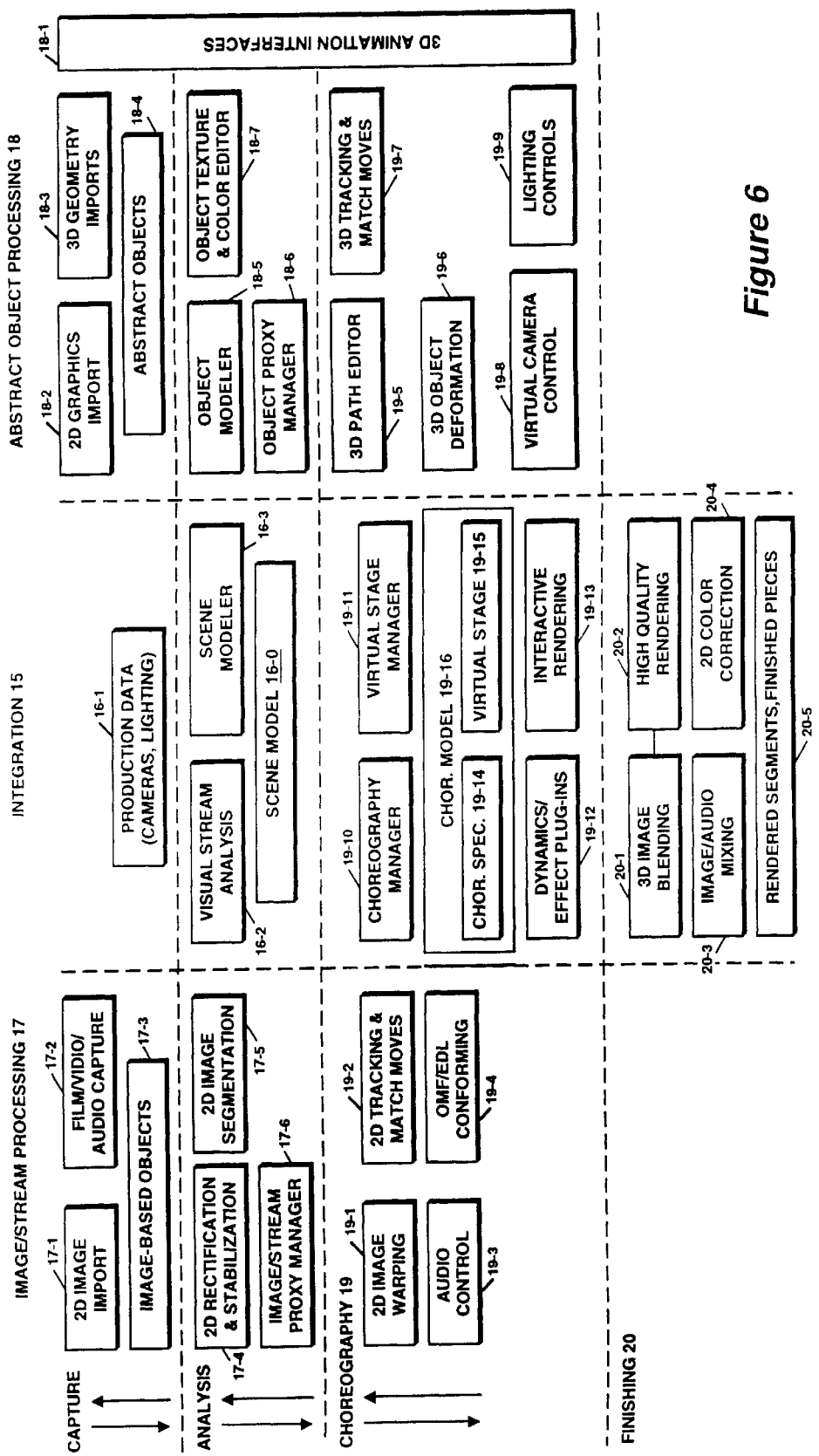
FIG. 6 is a software system architecture diagram of the integrated production system.

FIG. 6 is a more detailed software architecture diagram of the integrated media production system 10. The various software modules in general carry out the functions of the integration process 15. These software components of the system 10 may typically be implemented using object oriented programming languages and data base structures.

The various software modules can be grouped by the general function or functions to which they interface as indicated by the dashed horizontal and vertical lines. For example, image/stream processing 17 and abstract object processing 18 modules may further each be divided into modules that support the capture, analysis, choreography and finishing process steps. Note that these process steps are generally sequential in nature, but multiple iterations between and among steps as selected by a user of the system 10 must also be supported.

The modules that implement the integration phase 15 generally include the various modules shown in the middle section of FIG. 6 between the dashed lines, as supported by the modules in both image/stream processing 17 and abstract object processing 18.

The image/stream processing modules 17 are principally concerned with the integration between live/recorded media stream production 12 and the integration phase 15. These include various modules devoted to media capture, such as a 2D image importer 17-1 and film/video/audio capture 17-2. These media capture processes 17-1 and 17-2 result in the creation of various types of two dimensional (2D) visual data objects or one dimensional (1D) audio data objects. These various data objects are collectively referred to herein as image-based data objects 17-3 that represent various live/recorded media elements. These image-based objects 17-3 typically include image map data representing all or part of the sampled visual portion of a media element and/or audio data representing sampled audio information. The resulting image-based objects 17-3 may be stored in a data structure called the object catalog.

To support the analysis phase, image/stream processing 17 can include 2D rectification and stabilization modules 17-4, a 2D image segmentation module 17-5, and an image stream proxy manager 17-6. The 2D rectification and stabilization process 17-4 operates on image-based data objects to compensate for lens distortion, camera shake and other distortions created during image capture. The 2D image segmentation modules 17-5 separate individual portions of individual images of interest as segmented data objects. Segmented objects, for example, may include selected portions of the image map data from a given image-based data object 17-3 of interest.

The image/stream proxy manager 17-6 may accept image-based data objects as inputs and produce other image-based objects such as image pyramids of varying resolution. The proxy manager 17-6 may, for example, given a visual image of a particular resolution, produce a pyramid representation consisting of multiple image-based data objects that each represent a successively lower resolution version of the input image. The successive lower resolution levels of the image pyramid may be in terms of both color resolution and as spatial resolution.

Turning attention now to the right-hand side of FIG. 6, the abstract object processing modules 18 are principally concerned with the interface between the synthetic media production process 13 and the integration process 15. These modules may make use of available interfaces 18-1 to selected 3D graphic, animation or synthetic audio systems. These 3D animation interfaces 18-1 therefore can import and/or export a number of different types of synthetic or "abstraction-based" objects, including geometric object models, motion paths, surface textures, synthetic cameras, synthetic lights, dynamic specifications, and other related information.

Other synthetic objects can be imported into the object catalog as abstract objects 18-4 through a 2D graphics import module 18-2, as well as additional 3D object models imported through the 3D geometry import module 18-3.

Abstract object processing 18 functions to support the analysis phase can include an object modeler 18-5, an object proxy manager 18-6, and object texture and color editor 18-7.

The object modeler 18-5 and object texture and color editor 18-7 permit the user to modify imported abstract objects and/or construct further synthetic model objects 18-4. For example, the user may use an external animation system to produce an initial version of an object but thereafter wish to edit the synthetic objects 18-4 and/or combine it with data available from other systems. The object texture and color editor 18-7 further permits the user to define the visual aspects of a synthetic object such as its surface texture and colors.

The object proxy manager 18-6 provides a function analogous to that of the image proxy manager 17-6. In particular, a given synthetic object 18-4 may actually be defined as a hierarchical set of synthetic data objects with each specifying a different level of geometry detail, a different representation of surface texture, or other levels of synthetic object detail.

A production data import module 16-1 provides data concerning a production environment such as the physical position of cameras and lighting. The parameters are stored as camera objects and light data objects, respectively.

The analysis process 16 is implemented by a visual stream analysis module 16-2 and scene modeler 16-3. The visual stream analysis module 16-2 analyzes input visual streams to produce image-based objects 17-3 and estimated parameters for use by the scene modeler 16-3. The visual stream analysis module 16-2 also analyzes input image streams captured from physical objects in a physical object space to define the parameters of the 3D virtual stage.

The scene modeler 16-3 is responsible for developing one or more scene models 16-0. Each scene model 16-0 is hierarchical data object consisting of a list of the objects represented in a given scene, such as image-based objects 17-3, abstract objects 18-4, related cameras, lights and other production related data objects. Scene models 16-0 are developed using the results from the visual stream analysis module 16-2 and other data objects. A number of different image processing algorithms may also be used to derive information for building a scene model 16-0 from the input visual streams.

The scene modeler 16-3 may also combine this image-derived information with the synthetic objects imported as abstract objects 18-4.

The visual stream analysis 16-2 and scene modeler 16-3 also interact with one another to develop an object correlation mesh data structure in the scene model 16-0 that represents structured associations between objects of various types. For example, a segmented image-based object that represents an image of a table taken from an input media stream can be linked to one or more synthetic objects of the table provided by the object modeler 18-5.

As the scene modeler 16-3 develops a scene model 16-0, an inverse projective transform is created which relates information from the 2D image plane of a given image stream (typically taken from the perspective of the camera which captured the image stream) back to a scene coordinate system. The abstract objects 18-4 derived from a given visual image stream are thus defined with respect to this scene coordinate system, and their spatial relationship to corresponding image-based objects 17-3 is defined in part by this projective transform.

In order to manipulate and choreograph objects from a scene model 16-0 within the virtual stage, a mapping is typically specified. This mapping relates the scene coordinate system to a stage coordinate system of the virtual stage.

The virtual stage is a data structure within which the user may choreograph the production. The virtual stage includes a specification for the stage coordinate system, a list of objects as represented in one or more scene models 16-0, abstract objects, camera objects, light objects, acoustic objects, and other objects needed for choreography.

Similarly, abstract objects 18-4 are also typically defined within their own abstract coordinate system. Therefore, a mapping from this abstract coordinate system to the stage coordinate system of the virtual stage is also provided.

The choreography modules 19 are principally responsible for specifying how various data objects interact with one another to obtain a desired production result. The choreography process makes use not only of the previously mentioned list of image-based objects 17-3 and abstract objects 18-4, but also any related data and parameters from the scene model 16-0 and virtual stage 19-15

On the image/stream processing 17 side, the modules to support choreography 19 can include image warping 19-1, 2D tracking and move matching 19-2, audio control, and offline editing conforming 19-4.

Image warping 19-1 modules provide the ability to specify various warping operations to be performed on input image-based objects 17-3. 2D feature tracking modules 19-2 provide matching of image-based objects 17-3 with associated 2D path objects. Offline edit conforming 19-4 allows the manipulation of image-based objects 17-3 that need to be played back in a particular frame sequence in accordance with inputs provided from an external editing system.

On the abstract object processing 18 side, the modules that support choreography 19 can include a 3D path editor 19-5, 3D object deformation 19-6, 3D tracking 19-7, camera control 19-8, and lighting controls 19-9. The path editor 19-5 permits the user to specify paths of abstract objects 18-4. Object deformation 19-6 allows the specification of deformations to objects that simulate the results of gravity, collisions, pressure, and other physical interactions. Object deformation 19-6 can also be used to correct for errors introduced during the analysis function 16.

The 3D tracking modules 19-7 provide a function analogous to the 2D tracking 19-2 for the abstract objects 18-4. Camera control 19-8 and lighting controls 19-9 provide the user with further ability to specify and modify the parameters of virtual camera and light objects.

Within the integration 15 and choreography 19 processes there are a number of other modules, including a choreography manager 19-10, a virtual stage manager 19-11, a dynamics/effects plug-in interface 19-12, and interactive rendering module 19-13. These processes further develop a data structure referred to as the choreography model 19-16 that includes a choreography specification 19-14 and the virtual stage 19-15, as well as other objects necessary to characterize the choreography of the scene.

The choreography specification 19-14 provides a framework for specifying temporal and spatial relationships of various objects in the choreography process. It is a data structure that incorporates all of the information required to generate a choreographed scene from the list of image-based objects 17-3 and abstract objects 18-4. The data structure can be displayed to the user, exported, or imported as a descriptive or declarative language.

The choreography manager 19-10 provides a timeline representation of the choreography specification 19-14. This controls the specification of a hierarchical time line that defines the appearance of the elements of a scene, their temporal relationships and other framing aspects of the scene. This provides the user a way to describe, view and control the temporal flow of a particular choreography model.

The virtual stage manager 19-11 maintains and manipulates the current state of the virtual stage 19-15. The virtual stage manager 19-11 maintains the definition of a current state of the choreography model 19-16 cooperating with the choreography manager 19-10. The virtual stage 19-15, for example, describes the current state of all objects 17-3 and 18-4 for a particular frame, whereas the choreography specification 19-14 maintains how the virtual stage 19-15 changes over time.

The plug-in interface 19-12 can provide a way for an application programming interface (API) to access various elements of the choreography model, object catalog or other portions of the system 10.

The interactive rendering module 19-13 provides the user with a visual and audio preview of the choreography model 19-16 whenever requested, such as by rendering a visual representation of the choreography model. The choreography modules 19 also provide information to finishing modules 20.

The finishing modules 20 provide interactive control over the process of preparing, rendering, correcting and adjusting finished production segments. This process may include modules such as image blending 20-1, high quality rendering 20-2, image/audio mixing 20-3, and color correction 20-4. The finishing process 20 outputs a number of data structures representing rendered segments 20-5 and other pieces of finished media. These pieces of finish media can themselves be stored as image-based objects 17-13.

High quality rendering modules 20-2 and image blending 20-1 accept the choreography specification 19-14 and related objects in the choreography model 19-16 as inputs and provide a finished result in the desired sampled format such as output visual streams and audio streams. The rendering process 20-2 may either use its own rendering system or control the use of external rendering systems. The image blending modules 20-1 determine, such as on a pixel-by-pixel basis, how each frame of the resulting finish rendering should use the image-based objects 17-3, abstract objects 18-4, correlation mesh, and other information in the choreography model 19-16 to provide the finished result. The audio mixing module 20-3 insures that audio objects are appropriately mixed and synchronized with visual objects. A color correction module 20-4 provides an ability for the user to adjust colors once the image is in the output format.

A more detailed view of an exemplary scene model is shown in FIG. 7.

The scene model 40 (item 16-0 in FIG. 6) is a mechanism for achieving a unified representation of a scene which supports both image-based model objects 50 (17-3) and abstraction-based model objects 60 (18-4). The scene model 40 creates a common context for working with all object types 50 and 60, to permit the user to create renditions of the scene using both object types, with a high degree of confidence that the end result will be satisfactory. During the operation of the invention, the scene model 40 evolves into a unified representation of the scene and its dynamics, including correlations between the image-based objects 50 and abstraction-based objects 60 modeled in the scene, as reflected in the correlation mesh 80.

An exemplary scene model object 40 includes a spatial reference model 41, a list of objects 43 in the scene, other scene-related data objects 70, and the correlation mesh 80.

The spatial reference model 41 typically defines a scene coordinate system 41-1 for the physical scene that occurs in the natural physical universe, such as determined by the analysis algorithms 42 or sensors 38, from which the visual image stream was taken. The scene coordinate system 41-1 is then used as the basis for defining image-based objects 50, related abstraction-based objects 60 and actions thereon.

The spatial reference model 41 can also define an abstract coordinate system 41-2 for a synthetic scene such as originally created in a computer application such as a computer-aided design (CAD), computer graphics, or computer animation system. Visual stream(s) rendered from this synthetic scene can then be analyzed through image-based analysis techniques that are similar to those applied to streams of actual captured images from physical scenes, as will be described shortly. This can be done when an initial scene model 40 is not available or accessible, and the scene model 40 must be first derived, in whole or part, by analyzing the visual image streams 39.

The spatial reference model 41 of each type includes a space definition such as a volume inside a regular parallelopiped. This is typically a three-dimensional space bounded on each side by a rectangle, with opposite rectangles of the same size and relative orientation. The coordinate system is typically the Cartesian (X,Y,Z) system, with coordinate grid being linear in all three dimensions. Bounding planes are typically used to define the top, bottom, far left, far right, front, and back of the spatial reference model 41, with the point (0,0,0) being the intersection of the front, bottom, and far left bounding planes.

The scene model 40 also includes a list 43 of image-based 50 and abstraction-based 60 objects in the scene. In its simplest form, the object list 43 may simply be a collection of image-based objects 50-1, 50-2, . . . , 50-i, and abstraction-based objects 60-1, 60-2, . . . , 60-j.

However, any object may also be defined as a hierarchical object structure, where one object is composed of various constituent sub-objects. For example, an image-based object 50-h may consist of an image pyramid of a set of pixel regions 50-h-1, . . . 50-h-j. Likewise, an abstraction-based object 60-h representing a person may have sub-objects 60-h-1, 60-h-2, . . . , 60-h-4 that represent the arms, legs, head, and torso of the person, respectively. These sub-objects may themselves be composed of other sub-objects.

A typical scene model 40 is also dynamic in the sense that it can include a set of abstract operations 78 that are applied to the objects in the list 43. These abstract operations 78 are typically used to specify changes and movements of objects over time in the scene model 40, and can be defined in whatever terms are appropriate to the scene model 40, such as mathematical or geometric transformations (e.g., motion paths, surface deformations), or procedural animations (e.g., software instructions that specify an object's "behavior" and/or modify the object's properties over time).

To further permit realistic renditions from the scene model 40, representations of other physical objects in the scene such as lighting objects 74, camera objects 75, and viewing objects 76 are also included. Lighting objects 74 represent sources of lighting on the set (or location); camera objects 75 represent cameras; and viewing objects 76 represent the point of view of an observer. Lighting objects 74 and camera objects 75 are defined as a type of abstract object 60, whether derived from image analysis or user inputs.

Proxy objects 79 are three-dimensional objects to be correlated with, and eventually replaced by, either an image-based object stream 50 (as isolated from a digitized film/video clip or rendered animation) or another three-dimensional abstract object 60. There can be multiple levels of proxy objects 79 for the same input object, maintained by the system as a proxy set. This gives the user access to different versions of the object, to accommodate object and data exchange with other applications, and to permit interactive scene model development as described below.

The correlation mesh 80 contains a list of links 80-1, 80-2, . . . , 80-c between specific image-based objects 50 and abstraction-based objects 60. The correlation mesh 80 serves in its simplest form to store links between an image-based object 50 and an abstraction-based object 60 of a given physical object in the scene. The correlation mesh 80 thus provides an easy way to switch between the two different possible renditions of the physical object.

The correlation mesh 80 can also maintain multiple links between various object representations 50 and 60, and to iteratively examine and refine each such representation, resulting in a composite unified scene model 40 that has the advantages of both model types.

As a result, a number of processes can be used according to the invention to create a comprehensive scene model 40 which converges deterministically to provide as realistic a representation of the scene as possible. As will be described below, analysis 16 of scene dynamics can be progressively improved by using the image-based objects 50 in the scene model 40 as a predictive analytical tool. This is particularly the case if user intervention through a scene viewer and user interface is part of an adaptive feedback loop. Likewise, the choice of abstract objects 60 and their parameters in the scene model 40 can be progressively improved by using the estimates derived from analysis techniques 16, particularly if combined with user intervention.

Additional details of the correlation mesh 80 and analysis algorithms are described in greater detail in the U.S. Patent application being filed on even date herewith entitled, "Adaptive Modeling and Segmentation of Visual Image Streams," by Paul B. Madden, Philip R. Moorby, John S. Robotham and Jean-Pierre Schott incorporated by reference and filed on even date herewith and assigned to SynaPix, Inc. the assignee of the present invention.

While this invention has been particularly shown and described with references to preferred embodiments thereof, it will be understood by those skilled in the art that various changes in form and details may be made therein without departing from the spirit and scope of the invention as defined by the appended claims.

For example, the system may be used to choreograph a media production where the final 2D representation is generated at a later time, possibly under interactive control. Further, the system may have live/recorded media elements with no synthetic elements. For example, two image streams may be analyzed and combined, where the second image stream may also be captured from physical objects. The various functions of the integration process 15 can run on different networked computer systems. Finally, the integration process 15 can terminate with the choreography function 19, with an external system providing the equivalent of one or more aspects of the finishing function 20.

What is claimed is:

1. A method of media production comprising:
capturing at least one image stream from physical objects in a physical object space; and
in a data processing system, defining a three-dimensional virtual stage;
analyzing the image stream to define representations of physical objects in the virtual stage;
maintaining a correlation between representations of objects in the virtual stage and corresponding segments of the at least one image stream, the correlation being stored in a correlation mesh data structure linking representations of objects in the virtual stage to corresponding segments of the at least one image stream;
choreographing representations of objects within the virtual stage; and
providing a choreography specification for generation of a two-dimensional image stream of the virtual stage with the choreographed objects therein.

2. A method as claimed in claim 1 further comprising generating a two-dimensional image stream of the choreographed objects as viewed from a virtual camera specified within the virtual stage.

3. A method as claimed in claim 1 further comprising generating a two-dimensional image stream, details of the generated image stream being derived directly from the image stream captured from the physical objects.

4. A method as claimed in claim 1 wherein the choreographed representations of objects include three-dimensional representations of physical objects in the physical object space and three-dimensional representations of synthetic objects.

5. A method as claimed in claim 1 further comprising providing representations of camera and lighting, choreographing positions and orientations of camera and lighting, and generating the two-dimensional image stream as a function of the choreographed camera and lighting.

6. A method as claimed in claim 1 further comprising including abstract models as proxies of physical objects and, in generating the two-dimensional image stream, obtaining detail for those physical objects from the captured image stream.

7. A method as claimed in claim 1 further comprising, after choreographing and generating a two-dimensional image stream, capturing another image stream from physical objects in the virtual stage for use in generating a two-dimensional image stream from a choreography specification.

8. A method as claimed in claim 1 further comprising choreographing synthetic objects with physical objects in the virtual stage and, subsequent to the choreography and generation of a two-dimensional image stream, modifying the representations of synthetic objects.

9. A method as claimed in claim 1 further comprising displaying a three-dimensional representation of physical and synthetic objects within the virtual stage and displaying a preview of the two-dimensional image stream.

10. A method as claimed in claim 9 further comprising displaying the three-dimensional representation as viewed from a vantage point other than a virtual camera location for which the preview is displayed.

11. A method as claimed in claim 9 further comprising displaying temporal representations of the choreography specification.

12. A method as claimed in claim 11 further comprising displaying an object catalog of physical and synthetic objects within the virtual stage.

13. A method as claimed in claim 1 further comprising displaying temporal representations of the choreography specification.

14. A method as claimed in claim 1 further comprising associating audio tracks with at least one object in the virtual stage.

15. A method as claimed in claim 14 further comprising modifying the audio tracks as the step of choreographing representations of objects changes acoustic properties of the virtual stage.

16. A method as claimed in claim 1 wherein the representations of physical objects and representations of synthetic objects are object oriented models.

17. A method as claimed in claim 1 wherein the representations of objects include two-dimensional representations.

18. A method as claimed in claim 1 further comprising defining a three-dimensional path within the virtual stage that represents the motion associated with at least one feature of an object represented in the virtual stage.

19. A method as claimed in claim 1 further comprising generating in the choreography specification inter-object effects including shadows and reflections between plural objects represented in the virtual stage.

20. A method as in claim 1 additionally comprising the step of:
accessing segments of the at least one image stream by reference to at least one object representation in the virtual stage through a corresponding link in the correlation mesh.

21. A method as in claim 1 additionally comprising the step of:
accessing at least one object representation in the virtual stage by reference to at least one image stream through a corresponding link in the correlation mesh.

22. A method as in claim 1 additionally comprising the step of:
presenting an interactive display of intermediate results of storing the correlation mesh data structure whereby a user specifies which one of multiple representations of object in the virtual stage are linked to a corresponding segment of the at least one image stream.

23. A method of media production comprising, in a data processing system:
a) providing a three-dimensional virtual stage;
b) providing at least one image stream captured from one or more physical objects;
c) providing at least one pixel representation segmented from the at least one image stream that at least partially represents at least one physical object captured in the at least one image stream;

d) providing at least one abstract model of at least one of the physical objects in the at least one image stream;

e) storing in a correlation mesh data structure representations of links between objects in the virtual stage, at least one such correlation link correlating at least one of the pixel representations of the physical object with at least one corresponding segment of the at least one image stream and with at least one corresponding abstract model of the same physical object;

f) in a choreography process, iteratively specifying and controlling how the abstract model of the physical object is manipulated within the virtual stage; and g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream.

24. A method as claimed in claim 23 further comprising providing abstract models of multiple physical objects.

25. A method as claimed in claim 23 further comprising providing abstract models of synthetic objects.

26. A method as claimed in claim 23 further comprising correlating audio tracks with a three-dimensional path.

27. A method as claimed in claim 23 further comprising displaying a representation of the three-dimensional virtual stage, a representation of the choreography specification, and a catalog of image streams and abstract models of objects.

28. A method as claimed in claim 23 further comprising generating two-dimensional images from a combination of the choreography specification, the abstract model and the two-dimensional pixel representation.

29. A method as claimed in claim 23 further comprising providing a preview window, a two-dimensional rendered display of the three-dimensional virtual stage from the viewpoint of a specified virtual camera based on a combination of the choreography specification, the abstract model and the pixel representation.

30. A method as claimed in claim 23 further comprising providing rendered results in a two-dimensional preview window at different levels of quality and resolution based on user control.

31. A method as claimed in claim 23 further comprising specifying and controlling during the choreography process the creation of a two-dimensional geometric path that represents the motion in image-space associated with at least one specified feature of pixel representations correlated across successive frames in an image stream.

32. A method as claimed in claim 23 further comprising specifying and controlling during the choreography process the parameters for an automated procedure that projects a two-dimensional path derived from analysis of movements in image-space into the related three-dimensional path within the three-dimensional virtual stage.

33. A method as claimed in claim 23 further comprising specifying and controlling during the choreography process the creation of a three-dimensional geometric path that represents the motion associated with at least one feature of an abstract model in the three-dimensional virtual stage.

34. A method as claimed in claim 23 further comprising specifying and controlling during the choreography process the assignment of a three-dimensional path to an abstract model in the three-dimensional virtual stage, such that the movement of one abstract model tracks the movement of another abstract model.

35. A method as claimed in claim 23 further comprising specifying and controlling during the choreography process the parameters for the alteration of surface characteristics of an abstract object.

36. A method as claimed in claim 23 further comprising specifying and controlling during the choreography process parameters for an automated process that generates inter-object effects including shadows and reflections between multiple abstract models represented in the three-dimensional virtual stage.

37. A method as claimed in claim 23 further comprising specifying and controlling during the choreography process parameters for an automated process that generates atmospheric effects that alter the generation of two-dimensional images from the abstract model represented in the three-dimensional virtual stage.

38. A method as claimed in claim 23 further comprising specifying and controlling during the choreography process parameters for an automated process that alters geometric characteristics of an abstract model in the three-dimensional virtual stage over a specified sequence of time.

39. A method as claimed in claim 23 further comprising specifying and controlling during the choreography process parameters for an automated inter-object process that alters geometric characteristics of an abstract model, in the three-dimensional virtual stage across a specified sequence of time such that the final result matches specified geometric characteristics of a second abstract model and that the intermediate results appear to be a gradual transformation from the first abstract model to the second abstract model.

40. A method as claimed in claim 23 further comprising providing user access to the choreography specification, correlation database, abstract model, pixel representation and image stream.

41. A method of media production comprising, in a data processing system:

a) providing a three-dimensional virtual stage, b) providing at least one image stream captured from one or more physical objects;

c) providing at least one pixel representation segmented from the at least one image stream that at least partially represents at least only physical object captured in the at least one image stream;

d) providing at least one abstract model of at least one of the physical objects in the at least one image stream;

e) correlating at least one of the pixel representations of the physical object with at least one image stream and with at least one corresponding abstract model of the same physical object;

f) in a choreography process, iteratively specifying and controlling how the abstract model of the physical object is manipulated within the virtual stage; and g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:

providing an abstract model of the camera's position.

42. A method of media production comprising, in a data processing system:
   a) providing a three-dimensional virtual stage;
   b) providing at least one image stream captured from one or more physical objects;
   c) providing at least one pixel representation segmented from the at least one image stream that at least partially represents at least only physical object captured in the at least one image stream;
   d) providing at least one abstract model of at least one of the physical objects in the at least one image stream;
   e) correlating at least one of the pixel representations of the physical object with at least one image stream and with at least one corresponding abstract model of the same physical object;
   f) in a choreography process, iteratively specifying and controlling how the abstract model of the physical object is manipulated within the virtual stage; and
   g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:
   providing an abstract model of the lighting used to illuminate the physical objects.

43. A method of media production comprising, in a data processing system;
   a) providing a three-dimensional virtual stage;
   b) providing at least one image stream captured from one or more physical objects:
   c) providing at least one pixel representation segmented from the at least one image stream that at least partially represents at least only physical object captured in the at least one image stream;
   d) providing at least one abstract model of at least one of the physical objects in the at least one image stream;
   e) correlating at least one of the pixel representations of the physical object with at least one image stream and with at least one corresponding abstract model of the same physical object;
   f) in a choreography process, iteratively specifying and controlling how the abstract model of the physical object is manipulated within the virtual stage; and
   g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:
   providing an abstract model of acoustics.

44. A method of media production comprising, in a data processing system:
   a) providing a three-dimensional virtual stage;
   b) providing at least one image stream captured from one or more physical objects;
   c) providing at least one pixel representation segmented from the at least one image stream that at least partially represents at least only physical object captured in the at least one image stream;
   d) providing at least one abstract model of at least one of the physical objects in the at least one image stream;
   e) correlating at least one of the pixel representations of the physical object with at least one image stream and with at least one corresponding abstract model of the same physical object;
   f) in a choreography process iteratively specifying and controlling how the abstract model of the physical object is manipulated within the virtual stage; and
   g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:
   providing the choreography specification in a human-readable form for use, review and modification.

45. A method of media production comprising, in a data processing system;
   a) providing a three-dimensional virtual stage;
   b) providing at least one image stream captured from one or more physical objects;
   c) providing at least one pixel representation segmented from the at least one image stream that at least partially represents at least only physical object captured in the at least one image stream;
   d) providing at least one abstract model of at least one of the physical objects in the at least one image stream;
   e) correlating at least one of the pixel representations of the physical object with at least one image stream and with at least one corresponding abstract model of the same physical object;
   f) in a choreography process, iteratively specifying and controlling how the abstract model of the physical object is manipulated within the virtual stage; and
   g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:
   creating and maintaining multiple choreography specifications that share a correlation database, abstract model, pixel representation and image stream.

46. A method of media production comprising, in a data processing system:
   a) providing a three-dimensional virtual stage;
   b) providing at least one image stream captured from one or more physical objects;
   c) providing at least one pixel representation segmented from the at least one image stream that at least partially represents at least only physical object captured in the at least one image stream;

d) providing at least one abstract model of at least one of the physical objects in the at least one image stream;

e) correlating at least one of the pixel representations of the physical object with at least one image stream and with at least one corresponding abstract model of the same physical object;

f) in a choreography process, iteratively specifying and controlling how the abstract model of the physical object is manipulated within the virtual stage; and g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:

creating and maintaining multiple versions of image stream and pixel representations and allowing determination of which version to use for generating an interactive display of intermediate results from choreography manipulations.

47. A method of media production comprising, in a data processing system:

a) providing a three-dimensional virtual stage;

b) providing at least one image stream captured from one or more physical objects;

c) providing at least one pixel representation segmented from the at least one image stream that at least partially represents at least only physical object captured in the at least one image stream;

d) providing at least one abstract model of at least one of the physical objects in the at least one image stream;

e) correlating at least one of the pixel representations of the physical object with at least one image stream and with at least one corresponding abstract model of the same physical object;

f) in a choreography process, iteratively specifying and controlling how the abstract model of the physical object is manipulated within the virtual stage; and g) generating a choreography specification that captures and allows a reproduction of the specified manipulations of at least one abstract model in the virtual stage, allowing the generation of a sequence of two-dimensional images of the virtual stage from a combination of the choreography specification, the at least one abstract model of the physical object, and the at least one of the pixel representations of the physical object in the image stream, further comprising the step of:

creating and maintaining multiple versions of abstract models and allowing determination of which version to use for generating an interactive display of intermediate results from choreography manipulations.

* * * * *